(12) United States Patent
Nagai

(10) Patent No.: US 7,315,159 B2
(45) Date of Patent: Jan. 1, 2008

(54) POWER SUPPLY FOR SWITCHING OPERATION, ELECTRONIC APPARATUS INCLUDING THE SAME, AND METHOD OF CONTROLLING THE SAME

(75) Inventor: Masayuki Nagai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/550,329

(22) Filed: Oct. 17, 2006

(65) Prior Publication Data

US 2007/0085521 A1 Apr. 19, 2007

(30) Foreign Application Priority Data

Oct. 19, 2005 (JP) .............................. 2005-304582

(51) Int. Cl.
*G05F 1/56* (2006.01)
(52) U.S. Cl. ...................................... 323/283; 323/351
(58) Field of Classification Search ................ 323/282, 323/283, 284, 285, 351
See application file for complete search history.

(56) References Cited

U.S. PATENT DOCUMENTS 6,663,209 B2 12/2003 Yoshida 6,791,305 B2 9/2004 Imai et al.
6,956,360 B2 * 10/2005 Matsuura et al. ........... 323/283
7,038,438 B2 * 5/2006 Dwarakanath et al. ...... 323/283
7,042,202 B2 * 5/2006 Sutardja et al. ............. 323/283

FOREIGN PATENT DOCUMENTS

JP 2001-225457 8/2001
JP 2003-259629 9/2003

* cited by examiner

*Primary Examiner*—Jessica Han
(74) *Attorney, Agent, or Firm*—Fitzpatrick, Cella, Harper & Scinto

(57) ABSTRACT

An object of this invention is to finely set the voltage at high speed without decreasing the efficiency. In a power supply for switching operation including a switching circuit, an output circuit, a control table which stores data on the ON and OFF periods of the switching circuit in correspondence with a set voltage, an arithmetic processing unit which performs reading operation from the control table and PWM operation, and a digital control unit which controls the switching circuit by outputting a PWM signal, feedback control based on the output voltage is performed in a case where the output voltage is not changed. When changing the output voltage, the feedback control is switched over to control based on data in the control table to change the output voltage at high speed.

9 Claims, 16 Drawing Sheets

STEADY STATE (CONSTANT Vout)

WHEN STEPPING UP Vout

POWER SUPPLY FOR SWITCHING OPERATION, ELECTRONIC APPARATUS INCLUDING THE SAME, AND METHOD OF CONTROLLING THE SAME

BACKGROUND OF THE INVENTION

1. Field of the Invention

The present invention relates to a power supply for switching operation, an electronic apparatus including the same, and a method of controlling the same. More specifically, this invention relates to an increase in response speed in a power supply for switching operation which can change an output voltage value to a plurality of values.

2. Description of the Related Art

A printer which prints information such as a desired character or image on a sheet-like print medium such as paper or a film is known as an information output apparatus for a wordprocessor, personal computer, facsimile apparatus, and the like.

Although various methods are known as the printing method of this type of printer, an inkjet method has recently received a great deal of attention because it can perform non-contact printing on a print medium such as paper, can easily print in color, and is quiet. As an ink-jet arrangement, a serial printing arrangement is generally widely used in terms of low cost and easy downsizing. In this arrangement, a carriage supports a printhead for discharging ink in accordance with desired print information. The printhead prints while reciprocally scanning in a direction perpendicular to the conveyance direction of a print medium such as paper.

Recently, personal computers, digital cameras, and the like are commonplace. An application capable of printing out photographs in accordance with a user's request is also widely used along with the increasing use of digital cameras and the like.

As image input devices such as digital cameras attain higher performance and larger process capacities, a printer serving as an output apparatus needs to achieve higher image quality and higher resolution. To meet this demand, there have been proposed many high-quality printers capable of high-resolution outputs, like outputs on photographic printing paper.

An inkjet printer having the above features is widely used as a printer capable of obtaining a high-quality output at low running cost. Recently, the inkjet printer tends to increase the density of nozzles serving as printing elements and increase the number of nozzles in order to increase the printout resolution while maintaining the print speed.

The inkjet printer generally comprises a discharged pressure generation source including a heater and piezoelectric element in one-to-one correspondence with each nozzle. Increasing the nozzle density and the number of nozzles puts a heavier load on the power supply which supplies power to the discharged pressure generation source including a heater and piezoelectric element.

If the load on the power supply increases, the ink discharge performance varies due to a driving voltage drop. This problem becomes serious particularly when the number of concurrently driven nozzles changes in accordance with print data. For example, if the ink discharge amount and discharge position precision change between printing of only one dot and simultaneous printing of a plurality of dots, the print result reflects these differences as quality deterioration of an output image. This problem occurs not only in the inkjet printer but also in a printing apparatus which adopts another printing method using many printing elements. A change of the driving voltage depending on the number of concurrently driven nozzles influences the power supply capacity, the wiring resistance from the power supply to the discharged pressure generation source, the common impedance and the like.

Along with increases in the number of nozzles and the print speed, the nozzle temperature tends to greatly rise due to remaining heat of the heater after printing. The temperature rise of the nozzle changes ink bubbling, changes the ink discharge amount and discharge position precision, and causes quality deterioration.

To solve the above problems and stably print an image, the driving voltage must be regulated in accordance with the number of concurrently driven printing elements. The inkjet printing apparatus must adopt a measure to regulate the driving voltage to be applied to the heater in consideration of even an increase in nozzle temperature, and stabilize the ink discharge amount and discharge position precision.

To solve the above problems, Japanese Patent Publication Laid Open No. 2001-225457 describes the arrangement of a plurality of driving voltage sources which branch from the same stabilized power supply circuit and have different voltages in a printing apparatus which prints on a print medium by a printhead having a plurality of printing elements. This arrangement can obtain a stable print result even upon a change of the number of concurrently driven printing elements, by selecting an appropriate driving voltage source in accordance with the number of concurrently driven printing elements.

Japanese Patent Publication Laid Open No. 2003-259629 describes feedback control based on the difference (error) between the actual output voltage value and a targeted output voltage value by using a digital control circuit in the control unit of a power supply for switching operation. This arrangement allows controlling an actual output voltage value to follow a targeted output voltage value at high precision and high speed.

However, in the method described in Japanese Patent Publication Laid Open No. 2001-225457 if many driving voltage sources of different voltages are used, this causes to increase the circuit scale and cost. It is, therefore, difficult to finely regulate (set) the driving voltage in consideration of the circuit scale and cost. On the other hand, recent inkjet printers are achieving small ink droplets to be discharged in printing. To stabilize ink discharge in picoliter (pl) order, it is preferable to finely regulate the driving voltage.

According to the method described in Japanese Patent Publication Laid Open No. 2003-259629, the response speed of the output voltage basically depends on the feedback response speed of the switching circuit. To attain both high response speed and stable voltage control, the switching frequency must be increased, which requires high efficiency of the power supply for switching operation. For example, the inkjet printer must regulate the voltage by about 1 V within a short time (e.g., about 10 μsec) in order to regulate the driving voltage of the printhead in correspondence with ink discharge control.

A power supply for switching operation for supplying power to a CPU or DSP generally switches the output voltage using a very high switching frequency in order to reduce power consumption. The printhead driving voltage of the inkjet printer or the like is, e.g., 20 V. The voltage applied to the CPU or DSP is, e.g., 3.3 V. The printhead driving voltage and the voltage applied to the CPU and DSP are different by one order of magnitude of the voltage value.

Increasing the switching frequency increases power loss in the power supply and generates a large amount of heat in the power supply.

Attaining both high response speed and high efficiency is a subject common to a power supply for switching operation having a digital control unit as disclosed in Japanese Patent Publication Laid Open No. 2003-259629, and to many other power supplies for switching operation using feedback control whose control frequency is determined by the switching frequency.

SUMMARY OF THE INVENTION

Accordingly, the present invention is conceived as a response to the above-described disadvantages of the conventional art.

For example, a power supply for switching operation according to this invention is capable of finely setting the voltage at high speed without decreasing the efficiency.

According to one aspect of the present invention, preferably, there is provided a power supply for switching operation, comprising: a switching circuit which switches input power by a switching element and generates a pulse output; an output circuit which converts an output from the switching circuit into a DC current and outputs the DC current; a control table which stores data on an ON period and OFF period of the switching circuit in correspondence with a set voltage; an arithmetic processing unit which performs reading operation from the control table and PWM operation; and a digital control unit which controls the switching circuit by outputting a PWM signal, wherein the digital control unit performs first control to control the switching circuit by feedback control based on a difference signal between the detected output voltage and a targeted output voltage in a case where the targeted output voltage is not changed, and performs second control to control the switching circuit on the basis of data read out from the control table in a case where the targeted output voltage is changed.

According to another aspect of the present invention, preferably, there is provided a method of controlling a power supply for switching operation comprising: a switching circuit which switches input power by a switching element and generates a pulse output; an output circuit which converts an output from the switching circuit into a DC current and outputs the DC current; a control table which stores data on an ON period and OFF period of the switching circuit in correspondence with a set voltage; an arithmetic processing unit which performs reading operation from the control table and PWM operation; and a digital control unit which controls the switching circuit by outputting a PWN signal, the method comprising the step of switching over between a first operation of controlling the switching circuit by feedback control based on a difference signal between the detected output voltage and a targeted output voltage in a case where the targeted output voltage is not changed, and a second operation of controlling the switching circuit on the basis of data read out from the control table in a case where the targeted output voltage is changed.

More specifically, according to the present invention, when the output voltage is not changed, feedback control based on the output voltage is performed. When changing the output voltage, the feedback control switches over to control based on data in the control table to change the output voltage.

In feedback control in a normal state, the switching frequency can fall within a range where the power supply efficiency is high. In addition, upon changing the output voltage, it can be changed at high speed on the basis of data in the control table.

The present invention can change the output voltage at high speed without decreasing the power supply efficiency, and can suppress the data amount of the control table.

The power supply for switching operation may further comprise an output voltage detection circuit which detects a voltage output from the output circuit, and when changing the targeted output voltage in the second control by the digital control unit, the digital control unit may correct data read out from the control table on the basis of the detected output voltage value, and control the switching circuit on the basis of the corrected data.

The output circuit may include a smoothing filter having a coil and a capacitor. In this case, the digital control unit preferably controls to shorten a period during which the second control is performed, so that a coil will not be saturated.

In this case, the timing when switching over between the first control and the second control is preferably the timing when the coil current maximizes or minimizes in a cycle of the switching element in the first control. The digital control unit may set a stabilization period for stabilizing the difference signal in switching over from the second control to the first control.

The control table may store correction data for the ON period and OFF period of the switching circuit in correspondence with the set voltage, and the second control may include controlling the switching circuit by feedback control based on the correction data read out from the control table.

As the arrangement of an electronic apparatus which includes a power supply for switching operation, a control device which controls the overall electronic apparatus may incorporate the digital control unit.

A specific example of the electronic apparatus is a printing apparatus which is configured to print by a printhead having a plurality of printing elements, and receives a driving voltage of the printhead from the power supply for switching operation.

The above object is also achievable by a computer program which causes a computer apparatus to implement the method of controlling a power supply for switching operation, and a computer-readable storage medium which stores the computer program.

The invention is particularly advantageous since the switching frequency can fall within a range where the power supply efficiency is high in feedback control in a normal state, and the output voltage can be changed at high speed on the basis of data in the control table upon changing the output voltage.

Accordingly, the present invention can change the output voltage at high speed without decreasing the power supply efficiency, and can suppress the data amount of the control table.

Further features of the present invention will become apparent from the following description of exemplary embodiments with reference to the attached drawings.

DESCRIPTION OF THE EMBODIMENTS

Figure 1:
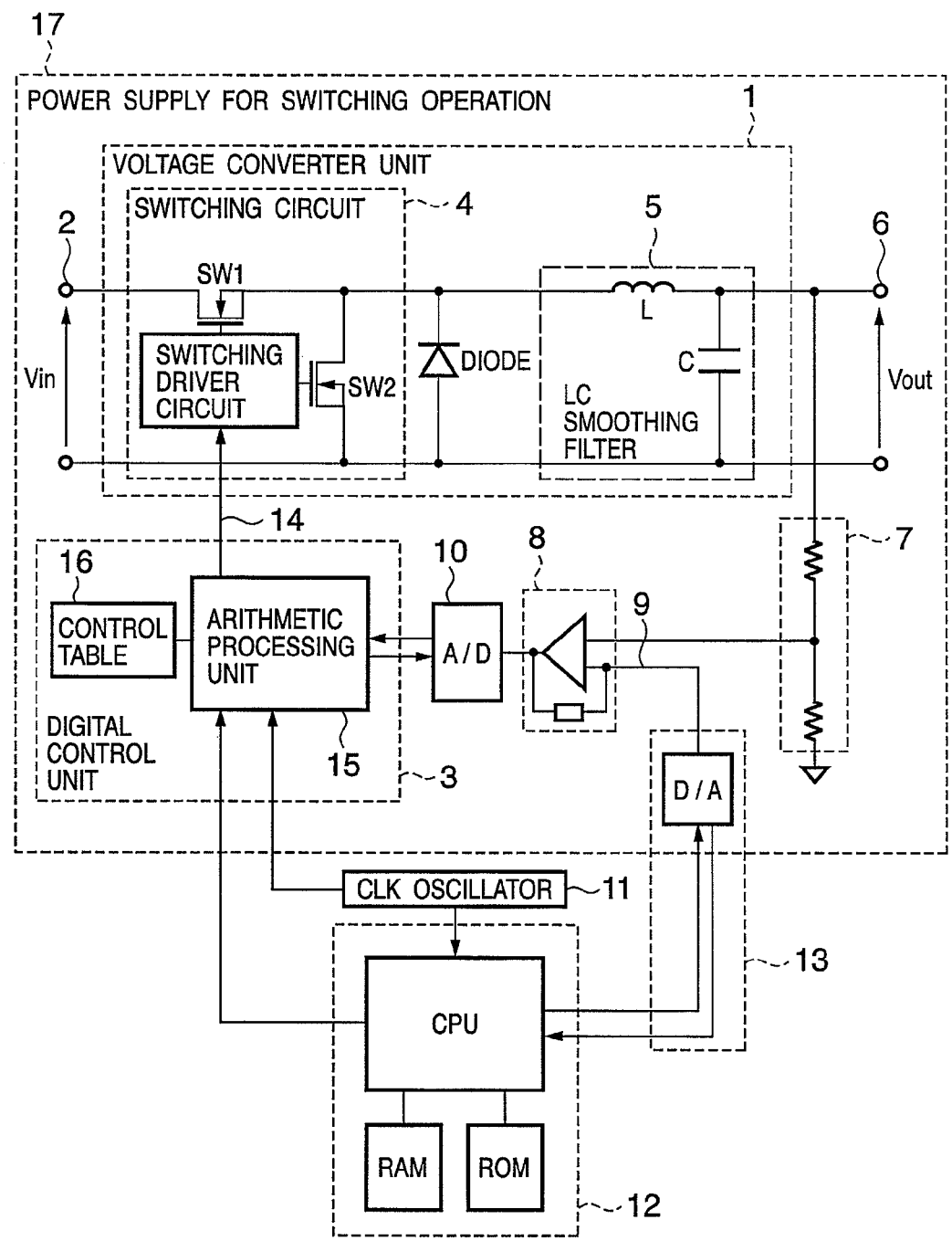
FIG. 1 is a block diagram showing the arrangement of a power supply for switching operation and part of an electronic apparatus including the power supply for switching operation according to the first embodiment of the present invention.

Preferred embodiments of the present invention will now be described in detail in accordance with the accompanying drawings.

Constituent elements described in the following embodiment are merely illustrative, and the scope of the invention is not limited to them. Note that the same reference numerals denote the same or similar parts throughout the description of the drawings.

In this specification, the terms "print" and "printing" not only include the formation of significant information such as characters and graphics, but also broadly includes the formation of images, figures, patterns, and the like on a print medium, or the processing of the medium, regardless of whether they are significant or insignificant and whether they are so visualized as to be visually perceivable by humans.

Also, the term "print medium" not only includes a paper sheet used in common printing apparatuses, but also broadly includes materials, such as cloth, a plastic film, a metal plate, glass, ceramics, wood, and leather, capable of accepting ink.

Furthermore, the term "ink" (to be also referred to as a "liquid" hereinafter) should be extensively interpreted similar to the definition of "print" described above. That is, "ink" includes a liquid which, when applied onto a print medium, can form images, figures, patterns, and the like, can process the print medium, and can process ink (e.g., can solidify or insolubilize a coloring agent contained in ink applied to the print medium).

Furthermore, unless otherwise stated, the term "nozzle" generally means a set of a discharge orifice, a liquid channel connected to the orifice and an element to generate energy utilized for ink discharge.

First Embodiment

FIG. 1 is a block diagram showing the arrangement of a power supply for switching operation and part of an electronic apparatus including the power supply for switching operation according to the first embodiment of the present invention.

As shown in FIG. 1, a power supply 17 for switching operation includes a voltage converter unit 1 and digital control unit 3, and is controlled by signals from a clock (CLK) oscillator 11 and control device 12 of the electronic apparatus main body. The voltage converter unit 1 includes a switching circuit 4 and output circuit 5. The switching circuit 4 converts an input voltage $V_{in}$ input to an input terminal 2 into intermittent pulse signals. The output circuit 5 converts a pulse signal output from the switching circuit 4 into a DC current, and outputs it as an output voltage $V_{out}$ to an output terminal 6. The switching circuit 4 comprises power switching elements SW1 and SW2 such as MOSFETs, a switching driver circuit which drives the power switching elements. The output circuit 5 comprises an LC smoothing filter.

An output voltage detection circuit 7 receives the output voltage $V_{out}$ obtained at the output terminal 6. An error amplifier 8 amplifies the error between an output (detection value) from the output voltage detection circuit 7 and a reference voltage 9 output from a voltage change circuit 13. An A/D converter 10 samples an output from the error amplifier 8 in a cycle instructed by the digital control unit 3, and outputs the sampling value to the digital control unit 3. The digital control unit 3 comprises an arithmetic processing unit 15 such as a DSP, a memory which stores a control table 16. The digital control unit 3 processes a sampling value output from the A/D converter 10, and outputs a PWM signal 14 to the switching circuit 4. The digital control unit 3 performs feedback control as the first control method unless the digital control unit 3 receives a voltage switching signal from the control device (to be referred to as a main controller hereinafter) 12 of the electronic apparatus main body.

When changing the output voltage, the main controller 12 outputs a voltage switching signal and voltage setting data to the digital control unit 3 of the power supply 17 for switching operation, and outputs voltage setting data to the voltage change circuit 13. The voltage change circuit 13 D/A-converts, e.g., input 8-bit voltage setting data, and outputs the conversion result as the reference voltage 9 to the error amplifier 8. Upon reception of the voltage switching signal, the digital control unit 3 switches the control method from feedback control serving as the first control method to the second control method. According to the second control method, the PWM signal 14 for changing the output voltage $V_{out}$ of the power supply 17 for switching operation at high speed is read out from the control table 16 on the basis of voltage setting data and output. The digital control unit 3 and main controller 12 operate in synchronism with a clock signal output from the CLK oscillator 11.

The control operation of the digital control unit 3 according to the first embodiment will be explained together with a description of the voltage regulating operation of the voltage converter unit 1.

The voltage regulating operation of a general voltage converter will be described.

Figure 4:
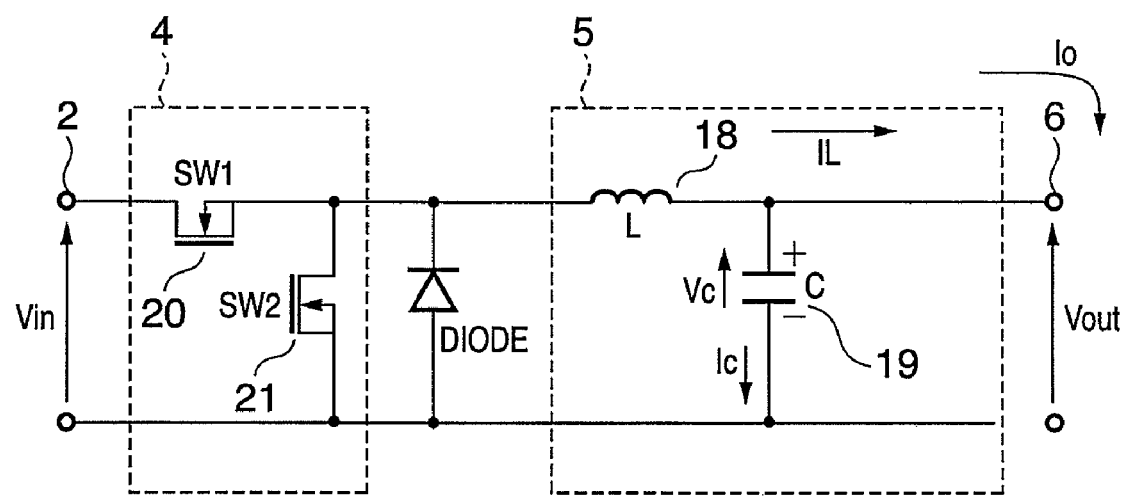
FIG. 4 is a block diagram showing a voltage converter unit extracted from a general synchronous rectification type of DC/DC converter.

FIG. 4 is a block diagram showing a voltage converter unit extracted from a general synchronous rectification DC/DC converter.

In FIG. 4, the ON/OFF states of a first switching element SW1 20 and second switching element SW2 21 of the switching circuit 4 are complementary to each other. The output voltage $V_{out}$ of the power supply for switching operation can be regarded as the potential difference $V_c$ across a capacitor C 19 of the LC smoothing filter in the output circuit 5. Thus, "to regulate $V_{out}$" means "to change $V_c$".

Letting $I_c$ be a current flowing through the capacitor C 19 and $\Delta Q$ be the charge change amount of the capacitor C 19, the change $\Delta V_c$ of $V_c$ is given by $$\Delta V_c = (1/C) \cdot \int I_c \cdot dt = (1/C) \cdot \Delta Q \quad (1)$$

$$IL = I_o + I_c \quad (2)$$

For the load current $I_o = 0$ [A]

$$IL = Ic \quad (3)$$

The output voltage $V_{out}$ can apparently be regulated by a change (motion) of the coil current IL.

Figure 5:
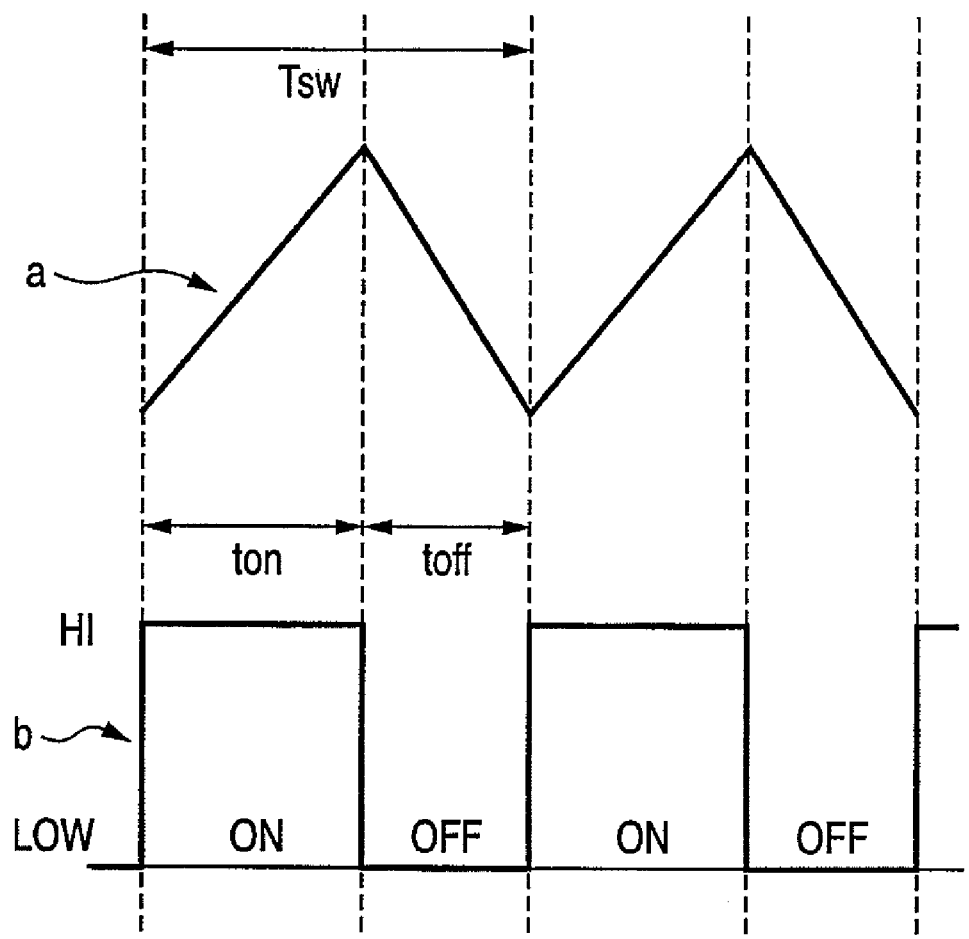
FIG. 5 is a graph showing a change of the coil current of a general power supply for switching operation.

The coil current IL exhibits a triangular wave as represented by a in FIG. 5 by turning on/off the first switching element SW1 20 and second switching element SW2 21. In FIG. 5, the period $T_{sw}$ is a switching cycle. Generally in PWM control, the switching cycle $T_{sw}$ of a pulse signal output as a PWM signal is always constant as represented by b in FIG. 5. The ratio of the ON period $t_{on}$ and OFF period $t_{off}$ of the first switching element SW1 20 in the switching cycle $T_{sw}$ is adjusted by control.

The ratio of the ON period $t_{on}$ of the first switching element SW1 20 to the switching cycle $T_{sw}$ is called a duty. In a steady state free from any change of the load or voltage, the duty is $$\text{Duty} = V_{out}/V_{in} \quad (4)$$

That is, when the output voltage Vout is in the steady state, Duty is determined by the ratio of the input and output voltages of the synchronous rectification type of DC/DC converter.

Figure 6:
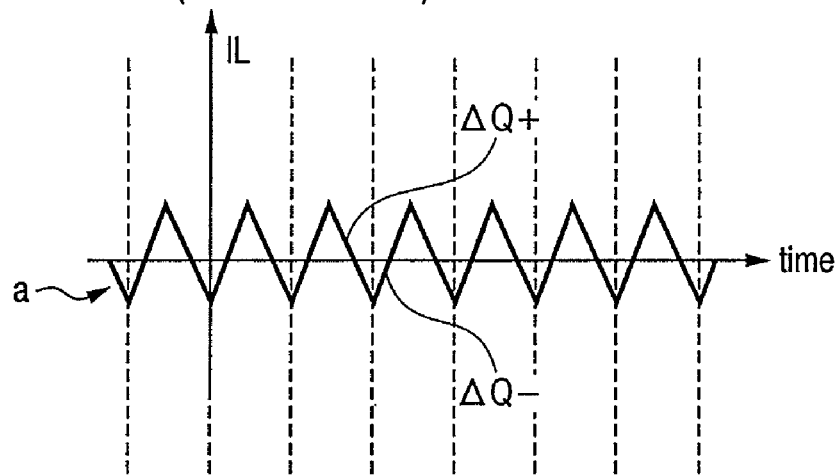
FIG. 6 is a graph for explaining the relationship between the output voltage and coil current of a general power supply for switching operation.
Figure 6:
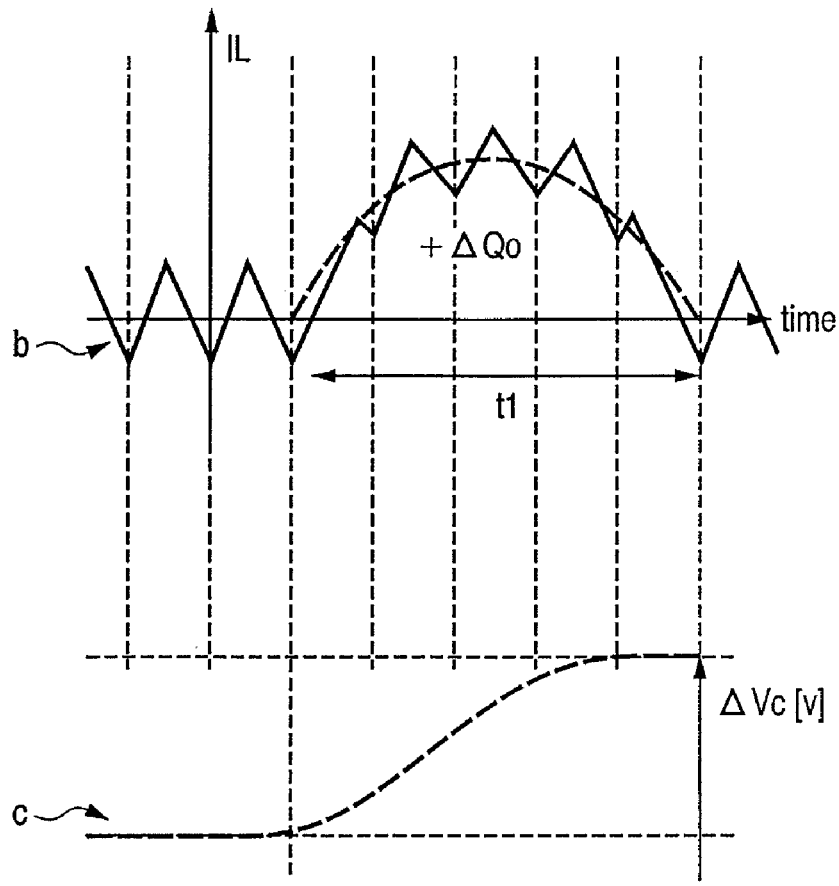

FIG. 6 is a graph for explaining the relationship between the output voltage and coil current of the power supply for switching operation. In FIG. 6, a represents a coil current in the steady state in which the output stabilizes at a constant voltage, i.e., neither the load nor voltage setting value changes. The coil current IL periodically repeats the ON and OFF states at a constant duty determined by equation (4). The center of this repetition is IL=0 [A] for the load current $I_o=0$ [A] while it is IL=Io for $I_o \neq 0$ [A]. In this case, $\Delta Q+ = \Delta Q-$, the charge amount of the capacitor C 19 does not change, and the output voltage $V_{out}$ is constant.

A case of raising the output voltage in changing it will be explained.

In FIG. 6, b represents a change of the coil current IL in raising the output voltage. When raising the output voltage $V_{out}$, the digital control unit 3 controls to prolong the ON period $t_{on}$ of the first switching element SW1 20 shown in FIG. 4 and increase the flowing coil current IL. After that, the OFF period $t_{off}$ of the first switching element SW1 20 becomes long, and IL decreases and stabilizes at IL=0 [A] for $I_o=0$ [A] or IL=$I_o$ for $I_o \neq 0$ [A]. That is, a temporal change of the magnitude of the coil current IL is concave down.

The capacitor accumulates charges corresponding to the area $+\Delta Qo$ in b and the output voltage $V_{out}$ rises in accordance with equation (1), and c represents rise of the output voltage corresponding to the coil current in b. To decrease the output voltage, the magnitude of the coil current IL is concave up, and charges in the capacitor decrease by $\Delta Q-$. As a result, the output voltage can decrease.

In this manner, according to a general PWM control, switching is controlled to change the output voltage, as shown in FIG. 6. A coil L 18 shown in FIG. 4 determines the slope of the coil current IL shown in FIG. 6, and the capacitor C 19 shown in FIG. 4 determines a charge amount necessary to change the output voltage in accordance with equation (1). Hence, the output voltage becomes changeable by downsizing the inductance L 18 and capacitor C 19 for the smoothing filter which forms the output circuit 5.

However, decreasing the values L and C also changes the frequency characteristic associated with stability of the voltage response of the feedback loop. To meet both stability of the voltage in the steady state and convergence to a target voltage in the transient state, the switching frequency $f_{sw}$ must be increased to control the coil current IL in a short switching cycle. However, simply increasing the switching frequency $f_{sw}$ decreases the conversion efficiency, resulting in damage and failure by generated heat, as described above.

To satisfy both the contradictory requirements for high response speed in changing the output voltage and stability in the steady state, the digital control unit in the first embodiment adopts different control methods between the steady state and the transient state for changing the output voltage. When changing the output voltage, the digital control unit 3 switches the control method.

The first control method implemented in the steady state is general feedback control. The arithmetic processing unit 15 converts a sampling signal from the A/D converter 10 in FIG. 1 into a PWM signal to control the switching circuit 4.

According to the second control method implemented in changing the output voltage, the ON and OFF periods of the switching circuit 4 are read out from the control table 16 and output as the PWM signal 14 to the switching circuit 4 in accordance with the change width of the output voltage. The sampling value of the A/D converter 10 and the value of voltage setting data input from the main controller 12 to the digital control unit 3 determine the change width of the output voltage. Alternatively, values before and after a change of voltage setting data input from the main controller 12 to the digital control unit 3 may determine the change width of the output voltage.

Figure 12:
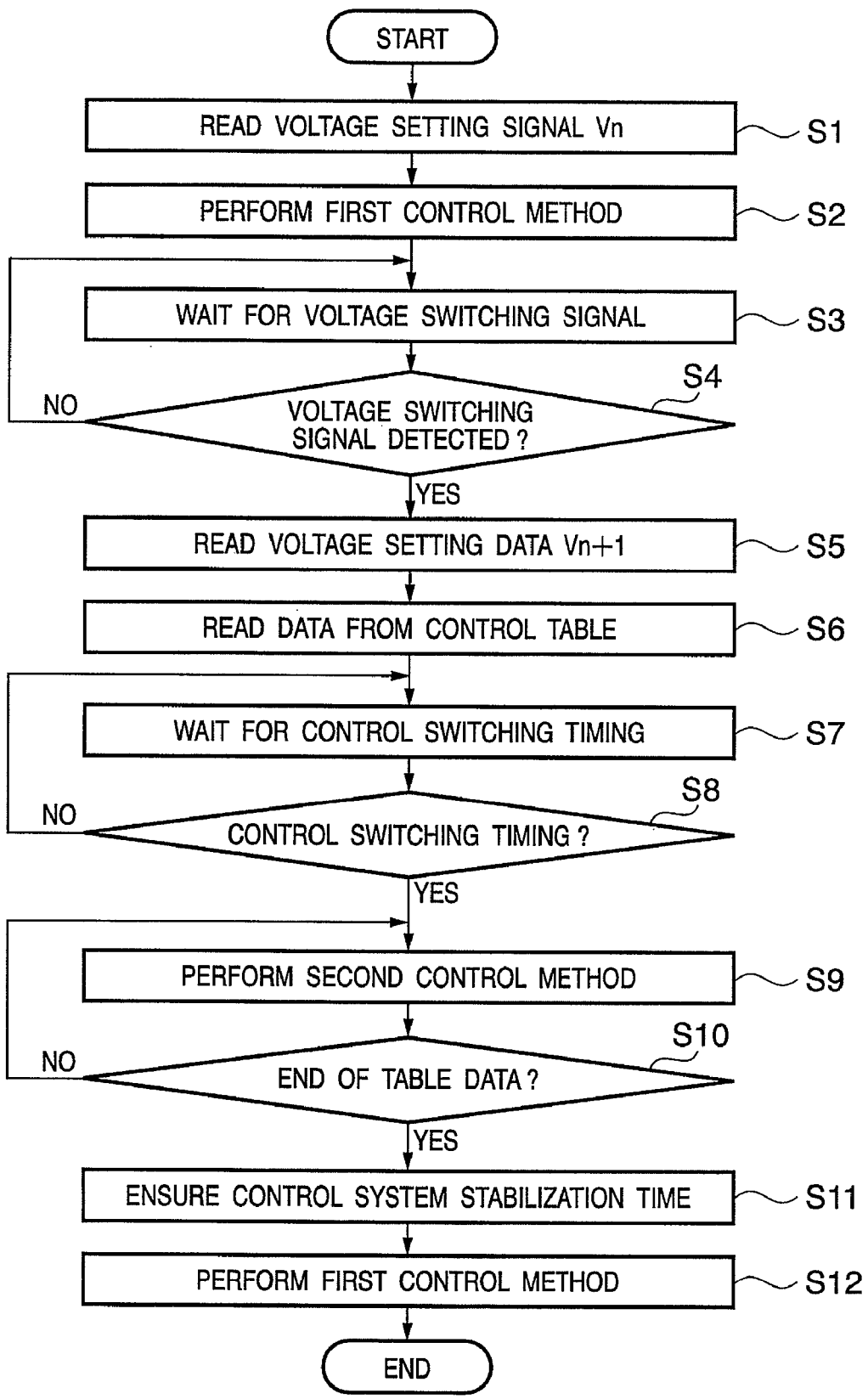
FIG. 12 is a flowchart showing the operation of a digital control unit 3 when changing the output voltage in the power supply for switching operation according to the first embodiment.

FIG. 12 is a flowchart showing the operation of the digital control unit 3 when changing the output voltage in the power supply for switching operation according to the first embodiment. An operation when the power supply 17 for switching operation changes the output voltage will be explained with reference to the flowchart of FIG. 12.

When the power supply 17 for switching operation is activated, the digital control unit 3 first reads voltage setting data Vn of an output voltage setting value from the main controller 12 (step S1). Then, the digital control unit 3 starts PWM control according to the first control method at a predetermined switching frequency using sampling data of the A/D converter as a feedback amount (step S2). The digital control unit 3 continues control according to the first control method until the main controller 12 of the electronic apparatus outputs a voltage switching signal (step S3).

After detecting the voltage switching signal (step S4), the digital control unit 3 reads set voltage data Vn+1 to be output (step S5). By referring to the values of A/D conversion sampling data of the error amplifier 8 and set voltage data Vn+1, the digital control unit 3 reads out, from the control table 16, the ON and OFF periods of the switching circuit 4 corresponding to a change width obtained from these two data (step S6). As another method, in step S5, the digital control unit 3 may obtain the change width of the output voltage from the values of the set voltage data Vn and Vn+1 before and after switching the voltage, instead of A/D conversion sampling data of the error amplifier 8. In this case, the digital control unit 3 does not use A/D conversion sampling data of the error amplifier 8.

The control table 16 used in the first embodiment will be explained. The main purpose of the first embodiment is to switch the voltage at high speed, so the control table 16 is set on the basis of the following concept.

To change the output voltage value at high speed within a short time when the values of the coil L 18 and capacitor C 19 shown in FIG. 4 are constant, the motion of the required coil current IL must satisfy the following conditions.

(1) The change width of the output voltage $V_{out}$ is an integral value of the coil current IL in accordance with equations (1) and (3). To greatly change the voltage per unit time, the coil current is changed in a region where the absolute value is large.

(2) When the voltage reaches a target value, the coil current IL returns to IL=0 [A] in the absence of a load or IL=$I_o$ in the presence of a load.

Under these conditions, when L and C are constant (known), the theoretically shortest time (theoretical limit time) taken to regulate the voltage is equal to a time taken to add or subtract, to or from the capacitor C 19, a charge amount corresponding to the change width of a necessary output voltage.

Figure 7:
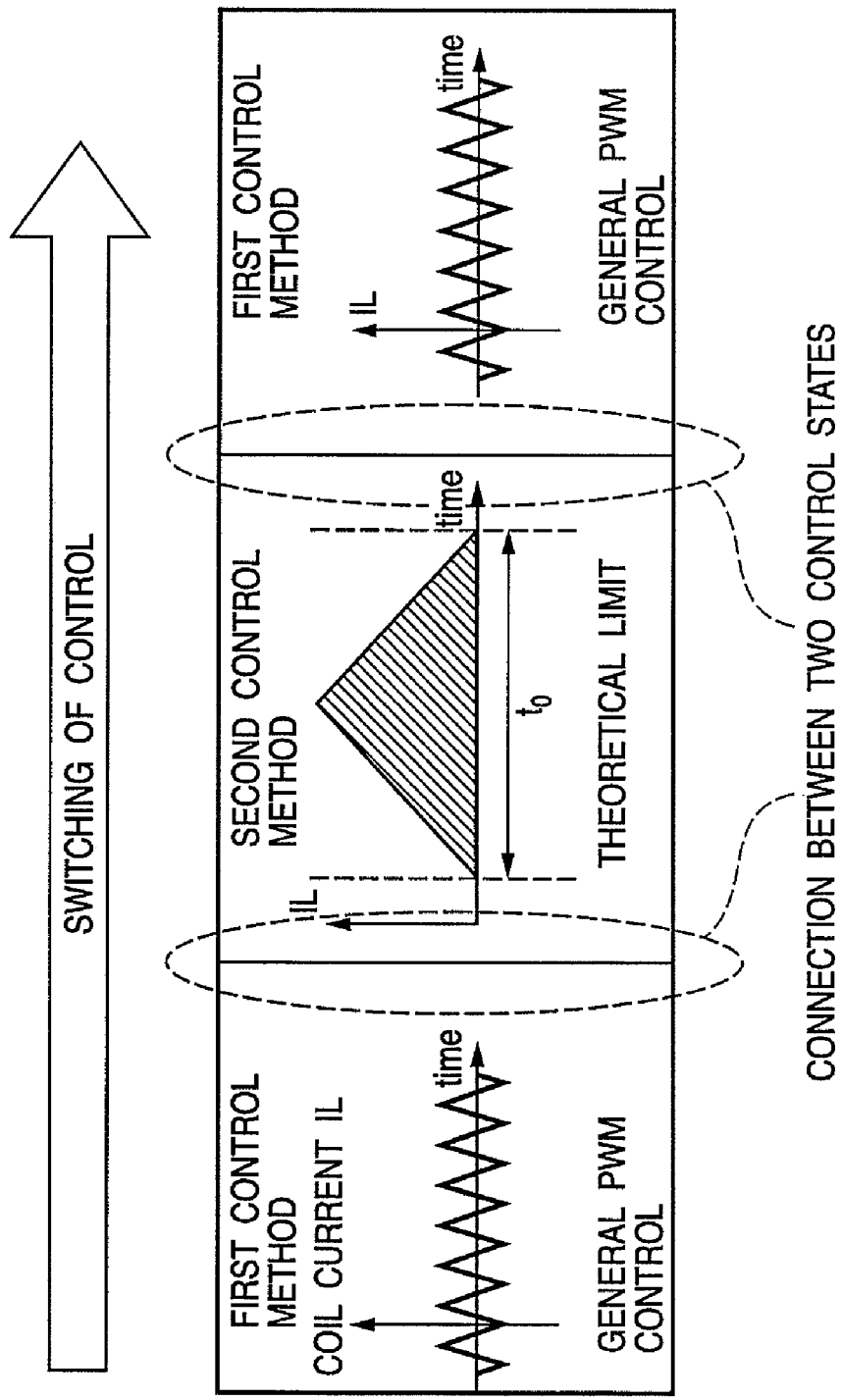
FIG. 7 is a view for explaining switching between the first and second control methods in the first embodiment.

FIG. 7 is a view for explaining switching between the first and second control methods.

In FIG. 7, the theoretical limit time is a time to taken to add or subtract, to or from the capacitor C 19, the charge amount ΔQ corresponding to the change width of the output voltage in one switching operation while neglecting the switching frequency $T_{sw}$ in the first control method.

In performing this control, the coil current IL must be controlled not to saturate the coil L 18 shown in FIG. 4. If the core of the coil L 18 is magnetic-saturated, the coil current IL becomes uncontrollable. When one voltage change width is extremely large or the output terminal 6 suffers a large load, it is risky to switch the output voltage to a target voltage by one switching operation, as shown in FIG. 7. In this case, the first embodiment sets a table in which the switching count is so increased as not to saturate the coil 18, without setting a table for switching the output voltage to a target voltage by one switching operation.

When switching the voltage, the switching count (cycle count) necessary for switching is changed depending on whether or not the value of the coil current IL is large enough to saturate the coil L 18 in the output circuit upon switching the voltage by one switching operation. More specifically, when the value of the coil current IL does not become large enough to saturate the coil L 18 in the output circuit upon switching the voltage by one switching operation, the first embodiment adopts a table for switching the output voltage $V_{out}$ by one switching operation. On the other hand, when the value of the coil current IL becomes large enough to saturate the coil L 18 in the output circuit upon switching the voltage by one switching operation, the first embodiment adopts a control table for switching the output voltage $V_{out}$ to a target voltage value by a sufficient and minimum number of switching operations.

Note that the first embodiment sets a table for the ON and OFF periods of the switching circuit 4 on the assumption that the load of the power supply for switching operation does not vary during switching of the output voltage.

After the digital control unit 3 reads out data on the ON and OFF periods of the switching circuit 4 from the control table 16, the process waits till the timing when the control method switches over to the second one (step S7).

For example, when switching the voltage in the steady state in which the output voltage is constant as represented by a in FIG. 6, the coil current IL varies according to a triangular wave at a constant duty in a constant cycle. If the timing when the control method switches over from the first control method to the second one is indefinite, the initial value ILo of the coil current IL greatly varies upon switching over to the second control method.

Figure 8:
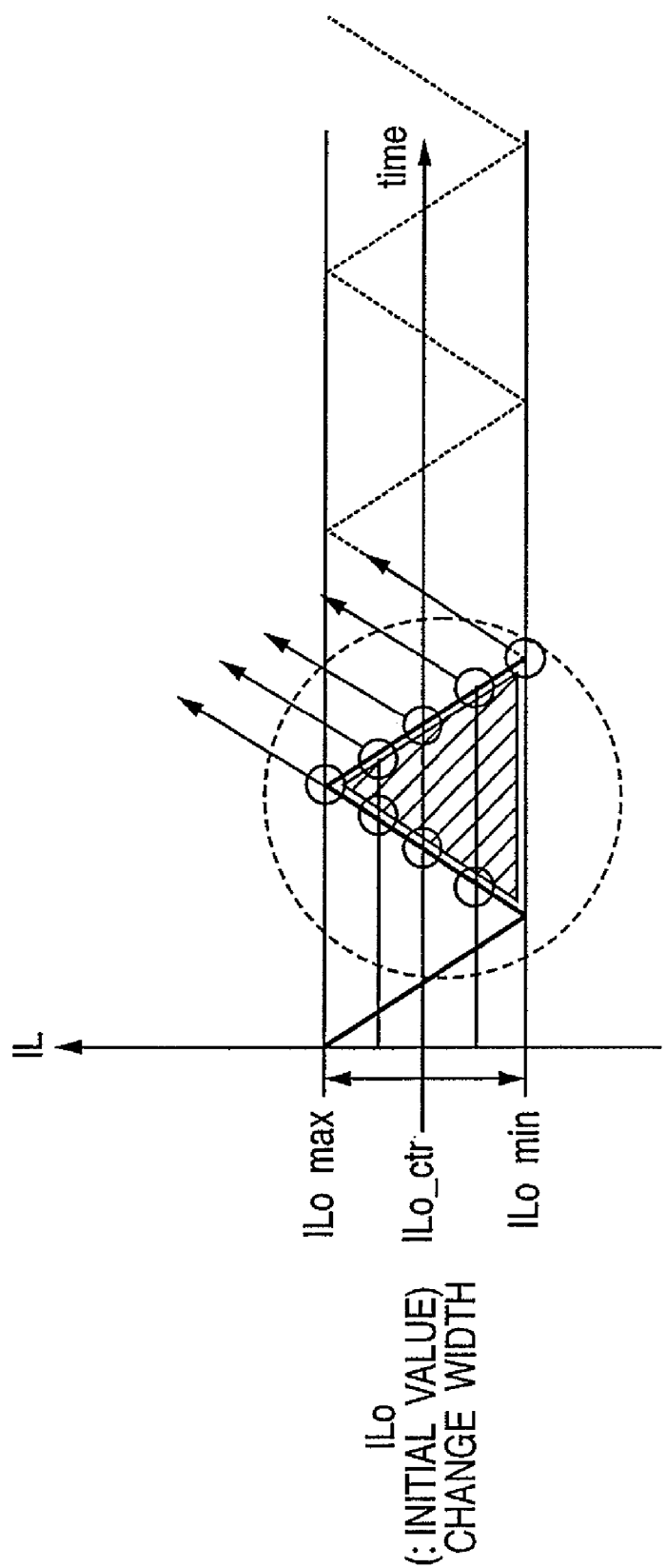
FIG. 8 is an enlarged view of part of the waveform of the coil current (IL) in order to describe the switching point of the control methods.

FIG. 8 is an enlarged view of part of the waveform of the coil current IL in order to describe the switching point of the control method.

In FIG. 8, ILo max and ILo min respectively represent the maximum and minimum values of the coil current IL in the steady state where the output voltage $V_{out}$ and load current Io of the power supply circuit do not change. The values of ILo max and ILo min are determined by the output voltage $V_{out}$ and load current Io in the steady state. As shown in FIG. 8, the initial value ILo of the coil current IL in the second control varies within the range of ILo max to ILo min depending on the control switching timing. Note that ILo_ctr denotes a center value of the variation range of ILo max to ILo min.

Figure 9:
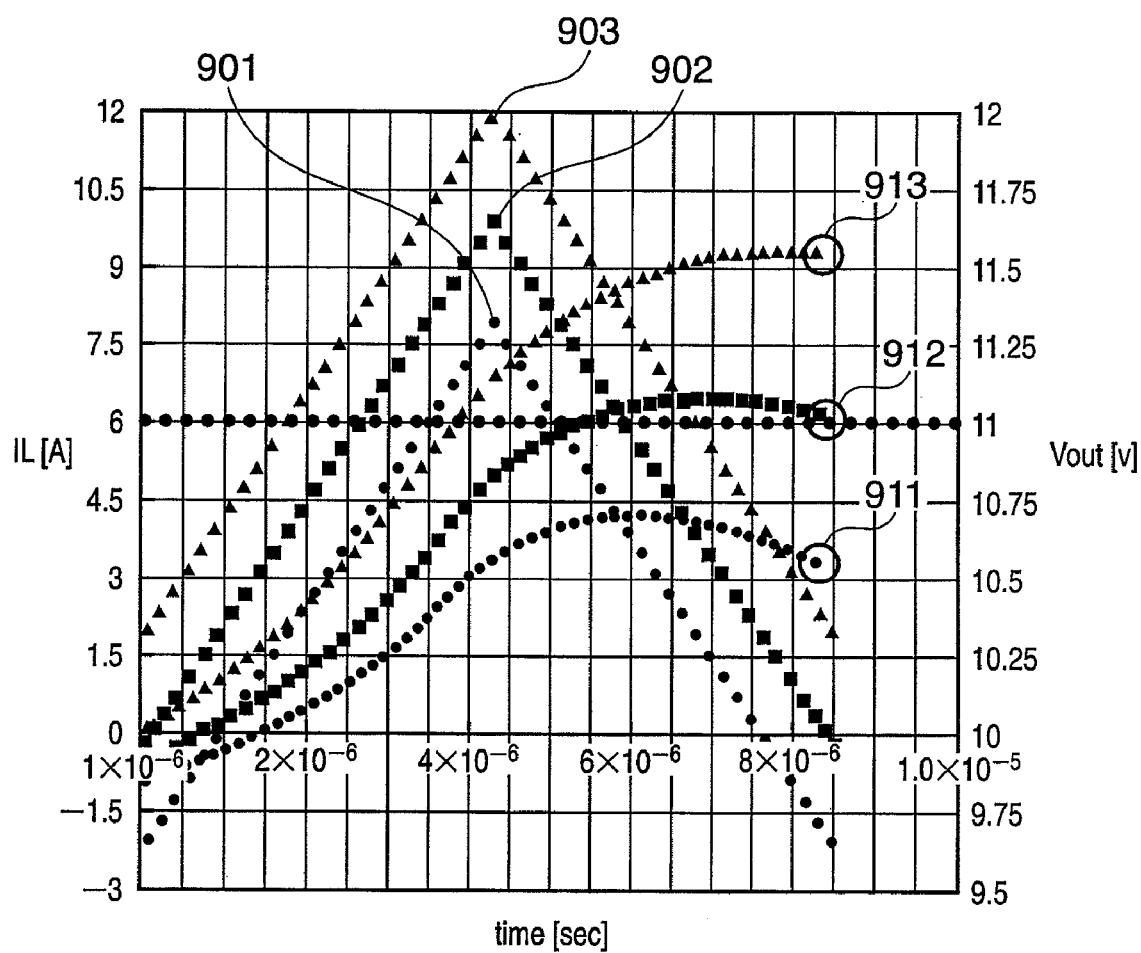
FIG. 9 is a graph showing the simulation results of the coil current and output voltage.

FIG. 9 shows the simulation results of the coil current and output voltage when setting the ON and OFF periods of the switching circuit 4 under the following conditions:

input voltage: $V_{in}$=20 [V],
output voltage: $V_{out}$=10 [V],
load condition: load current Io=0 [A],
SW frequency in first control: 300 kHz,
$V_{out}$ change width: +1 [V] (change from 10 V to 11 V), and
LC smoothing filter constant of output circuit 5: L=4.2 µH, C=39 µF.

In FIG. 9, reference numerals 901 to 903 denote changes of the coil current IL along the left ordinate axis; and 911 to 913, changes of the output voltage $V_{out}$ along the right ordinate axis. The changes 901 and 911 represent a case of switching the control when the coil current IL shown in FIG. 8 reaches ILo min. The changes 902 and 912 represent a case of switching the control when the coil current IL reaches ILo_ctr. The changes 903 and 913 represent a case of switching the control when the coil current IL reaches ILo max. As shown in FIG. 9, the output voltage 913 becomes higher by about 0.52 V than a targeted output voltage of 11 V. Since the voltage changes by 1 V, the output voltage 913 suffers an error of 50% or more from the target value.

To eliminate the error generated depending on the control switching timing, the first embodiment determines the input start timing of a voltage regulating pulse in accordance with the phase of the current IL in switching the control method (step S8).

Figure 10A:
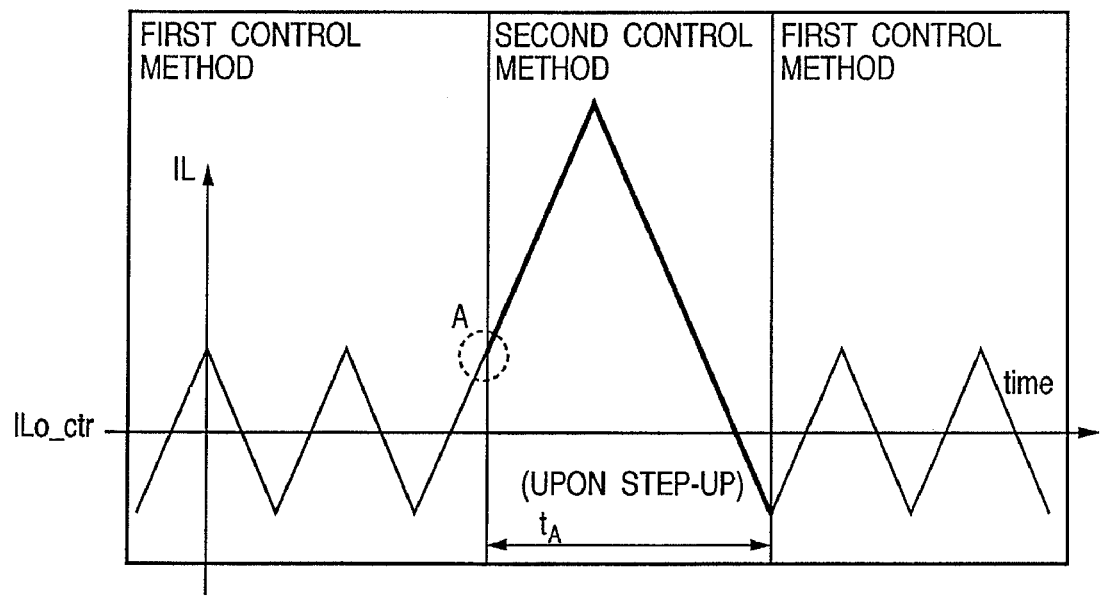
FIGS. 10A and 10B are timing charts showing a control method switching timing in the first embodiment.
Figure 10B:
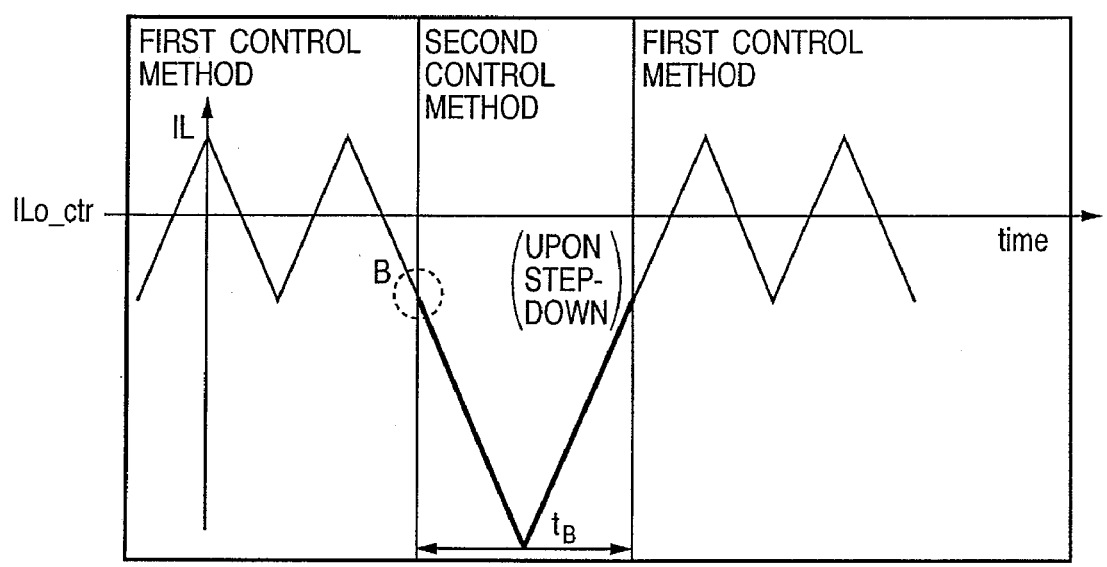

FIGS. 10A and 10B are timing charts showing a control method switching timing according to the first embodiment. FIG. 10A shows a switching timing when increasing (stepping up) the output voltage, and FIG. 10B shows a switching timing when decreasing (stepping down) it. When increasing the voltage, the control method switches over from the first control method to the second control method at point A where the coil current IL reaches ILo max, as shown in FIG. 10A. When decreasing the voltage, the control method switches over from the first control method to the second control method at point B where the coil current IL reaches ILo min, as shown in FIG. 10B.

Upon switching over to the second control method, the digital control unit 3 outputs corresponding ON and OFF periods to the switching circuit 4 till the end of the data in the control table 16 in accordance with the data of the control table 16 (step S10). As described above, the switching period designated by the control table 16 corresponds to one switching cycle or a sufficient and minimum number of switching cycles which does not saturate the coil 18 of the output circuit 5.

After the end of switching corresponding to data up to the final data in the control table 16, the control method switches over again from the second control method to the first control method. The switching timing is the timing when the coil current IL reaches ILo max in the case of increasing the voltage (FIG. 10A). Similarly, the switching timing is the timing when the coil current IL reaches ILo min in the case of decreasing the voltage (FIG. 10B). As described above, the value ILo min changes upon changing the output voltage value, so the table for the switching period in the second control is preferably set by calculating even the value ILo min after switching the output voltage. The timing when switching over from the second control method to the first control method in FIG. 10A is not limited to the timing when the coil current value reaches ILo min, and suffices to fall within the range of ILo min to ILo min+α. In this case, ILo min+α<ILo_ctr. The timing when switching over from the first control method to the second control method is not limited to the timing when the coil current value reaches ILo max, and suffices to fall within the range of ILo max−β to ILo max. In this case, ILo_ctr<ILo max−β.

The first embodiment ensures a control stabilization time in switching over to the first control method (step S11). More specifically, to ensure the time during which an output from the error amplifier stabilizes upon switching over from the second control method to the first control method, a duty value calculated from a target voltage is prepared and given to the first switching duty upon switching over to the first control method. In other words, the duty value is set such that an output from the error amplifier matches the output voltage.

Figure 11:
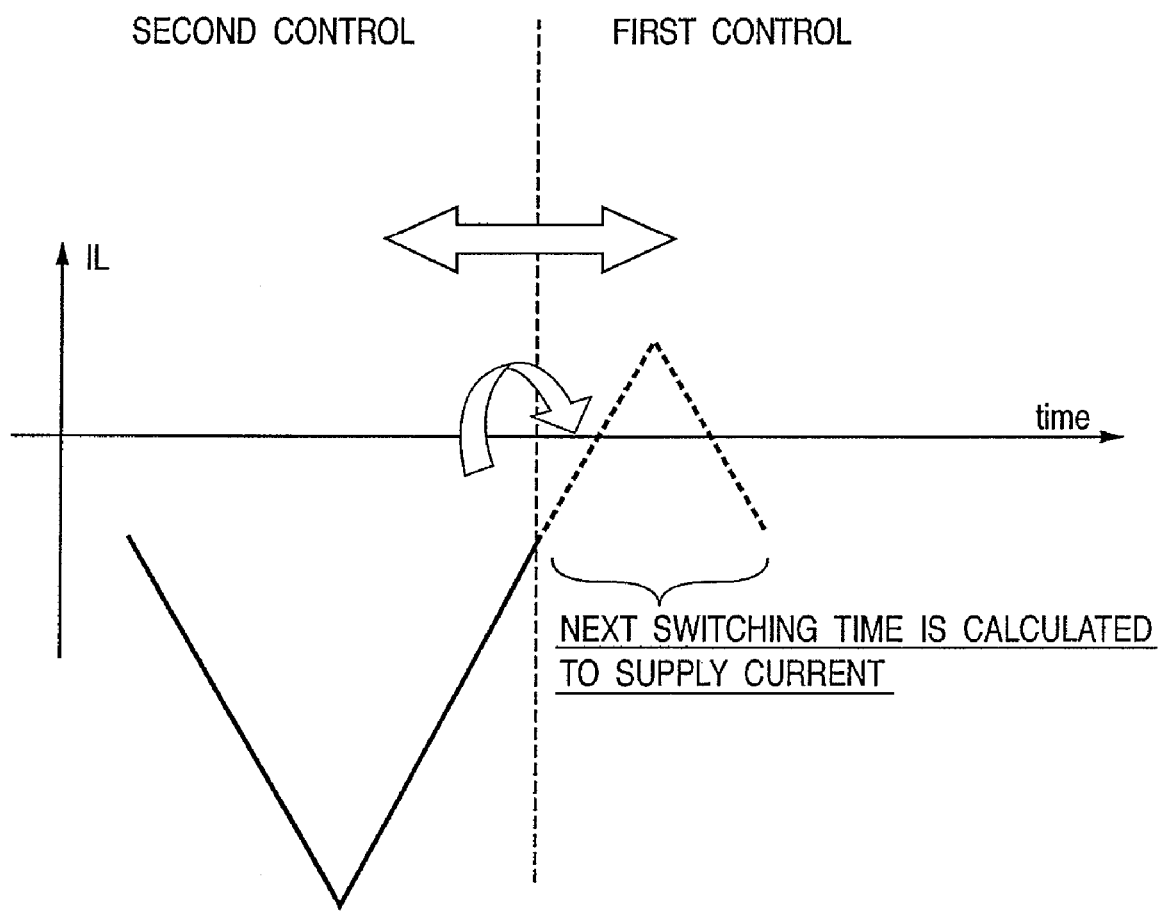
FIG. 11 is a partial enlarged view of the waveform of the coil current (IL) in switching over from the second control method to the first control method.

FIG. 11 is a partial enlarged view of the waveform of the coil current IL in switching over from the second control method to the first control method.

FIG. 11 shows a state when stepping down the voltage. The ratio of input and output voltages determines the duty of the synchronous rectification type of DC/DC converter, as represented by equation (4). When a target voltage value is known in advance and the voltage value is in steady state, the duty can be simply calculated. For the duty value, the first embodiment reads data stored in the table in advance as a sampling value without referring to the sampling value of the A/D converter 10 upon switching over to the first control method.

This control is necessary because, when switching over from the second control method to the first control method, an output from the error amplifier 8 may differ from a voltage value at which the output voltage $V_{out}$ stabilizes at the target voltage value in the steady state. For example, in the second control method there is a case where although control is made to decrease the voltage from 25 V to 20 V and the output voltage reaches 20V, an output from the error amplifier 8 remains at an intermediate voltage (e.g. 22 V) which is still changing to 20 V. There is a delay between the change of the output voltage and that of the output from the error amplifier 8. That is, an actual output voltage and an output from the error amplifier 8 have a gap. This gap occurs because an output from the error amplifier 8 changes with a delay from a change of the output voltage in order to stably implement a desired gain by the first control method. If control is performed using the sampling value of the A/D converter 10 directly as reference data of the feedback amount, the output voltage $V_{out}$ immediately after switching over the control method may fluctuate.

Then, the control method returns to the first control method, and the digital control unit 3 starts feedback control using the sampling value of the converter (step S12). As described above, the digital control unit 3 repeats a series of processes in the flowchart shown in FIG. 12 to change the output voltage $V_{out}$ of the power supply for switching operation, as needed.

Simultaneously when switching over to the second control method in step S9 of FIG. 12, the voltage change circuit 13 also changes the reference voltage 9, which is not the operation of the digital control unit 3.

As described above, the first embodiment obtains the following effects.

(1) A voltage output from the power supply for switching operation can be changed at high speed in accordance with a voltage change instruction from the electronic apparatus without decreasing the efficiency.

(2) The output voltage value can be set finely stepwise.

(3) The control part of the power supply for switching operation selectively employs feedback control and feedforward control based on a table, which reduces data in the control table.

(Modification)

Figure 2:
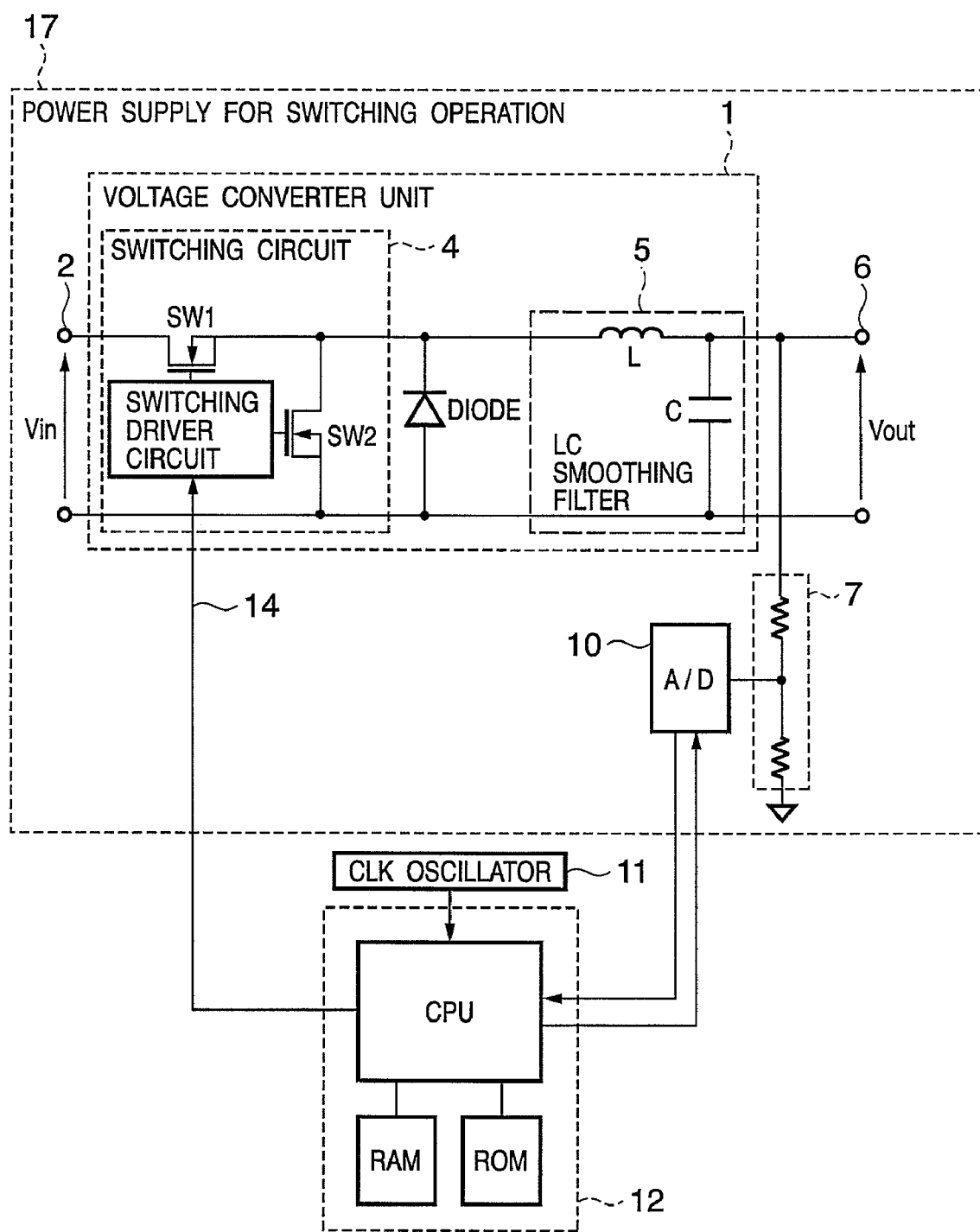
FIG. 2 is a block diagram showing a modification of FIG. 1 in which the control device of the electronic apparatus includes part of the arrangement of the power supply for switching operation.

If the performance of the main controller (CPU) 12 permits, the main controller 12 may take over some of the functions of the power supply 17 for switching operation. In this case, the arrangement shown in FIG. 1 becomes simpler. FIG. 2 shows a modification of the arrangement shown in FIG. 1, and shows an example of an arrangement in which the main controller 12 includes part of the arrangement of the power supply for switching operation.

The feature of the arrangement shown in FIG. 2 is that the main controller 12 includes the function of the digital control unit 3 in the power supply 17 for switching operation shown in FIG. 1. This arrangement can reduce the cost and size of the power supply 17 for switching operation.

In the arrangement shown in FIG. 2, the A/D converter 10 directly receives the detection value of the output voltage detection circuit 7, and the main controller 12 receives the sampling value of the A/D converter 10. Arranging a digital filter in the main controller 12 as above enables the power supply 17 for switching operation to omit the error amplifier 8 and voltage change circuit 13 in FIG. 1.

This arrangement is implementable even in the circuit arrangement shown in FIG. 1. Also in the circuit arrangement shown in FIG. 1, the digital control unit 3 can incorporate a digital filter to omit the error amplifier 8 and voltage change circuit 13.

Second Embodiment

A power supply for switching operation according to the second embodiment of the present invention will be explained. The second embodiment is also related to a power supply for switching operation used in an electronic apparatus, similar to the first embodiment. In the following description, the same parts as those in the first embodiment will be omitted, and features of the second embodiment will be mainly explained.

Figure 3:
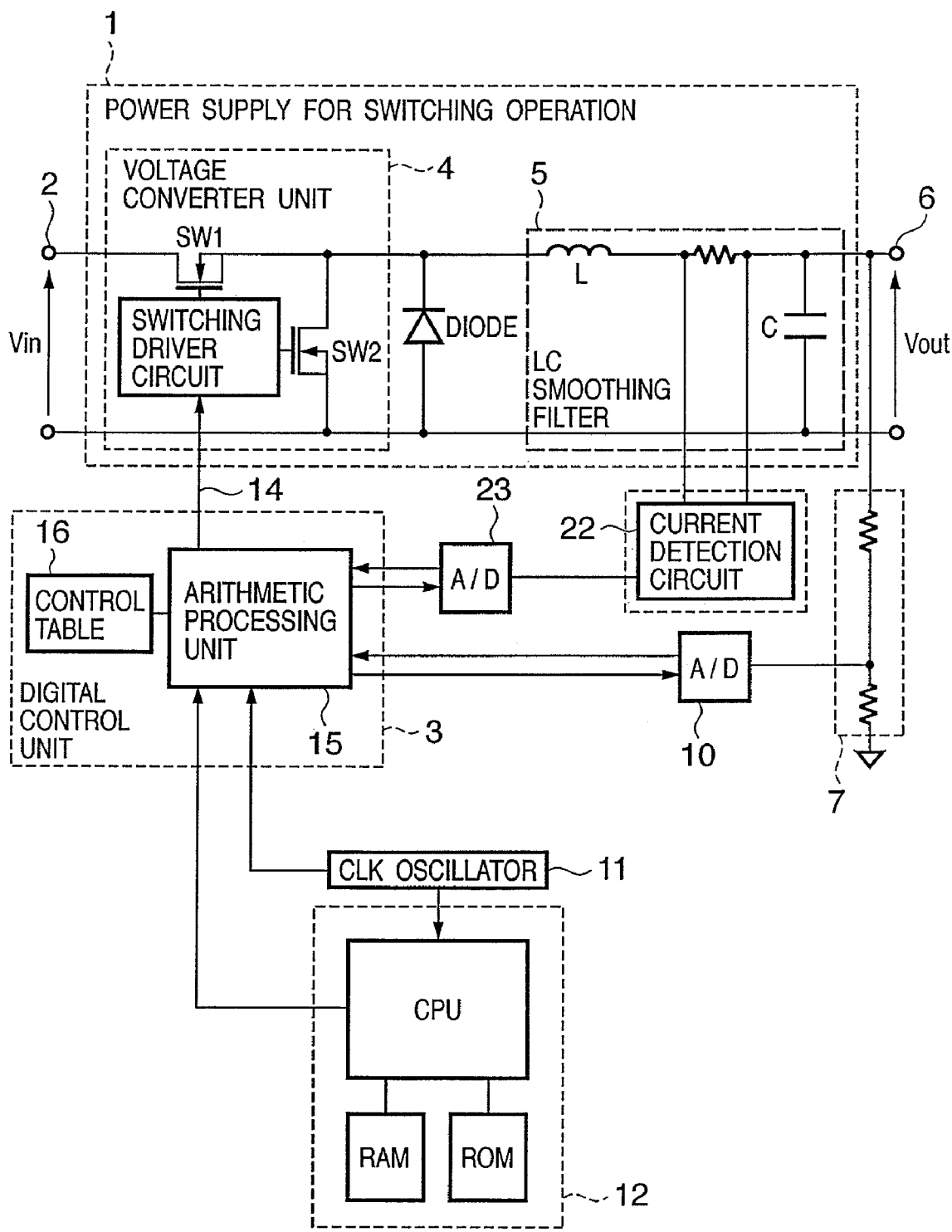
FIG. 3 is a block diagram showing the arrangement of a power supply for switching operation and part of an electronic apparatus including the power supply for switching operation according to the second embodiment of the present invention.

FIG. 3 is a block diagram showing the arrangement of a power supply for switching operation and part of an electronic apparatus including the power supply for switching operation according to the second embodiment of the present invention.

In the first embodiment, the error amplifier 8 amplifies the error between the detection value of the output voltage detection circuit 7 and the reference voltage 9. The A/D converter 10 samples an output from the error amplifier 8 in a cycle instructed by the digital control unit 3, and outputs the sampling data to the digital control unit 3.

To the contrary, in the second embodiment, an A/D converter 10 receives the detection value of an output voltage detection circuit 7, samples it every cycle instructed by a digital control unit 3, and outputs the obtained sampling data to the digital control unit 3. Further, the second embodiment employs a current detection circuit 22. An A/D converter 23 samples the detection value of the current detection circuit 22 in a cycle instructed by the digital control unit 3, and outputs the obtained sampling data to the digital control unit 3.

In the first embodiment, the second control method is basically different from the first control method. In the second embodiment, however, the second control method is basically the same as the first one.

Figure 13:
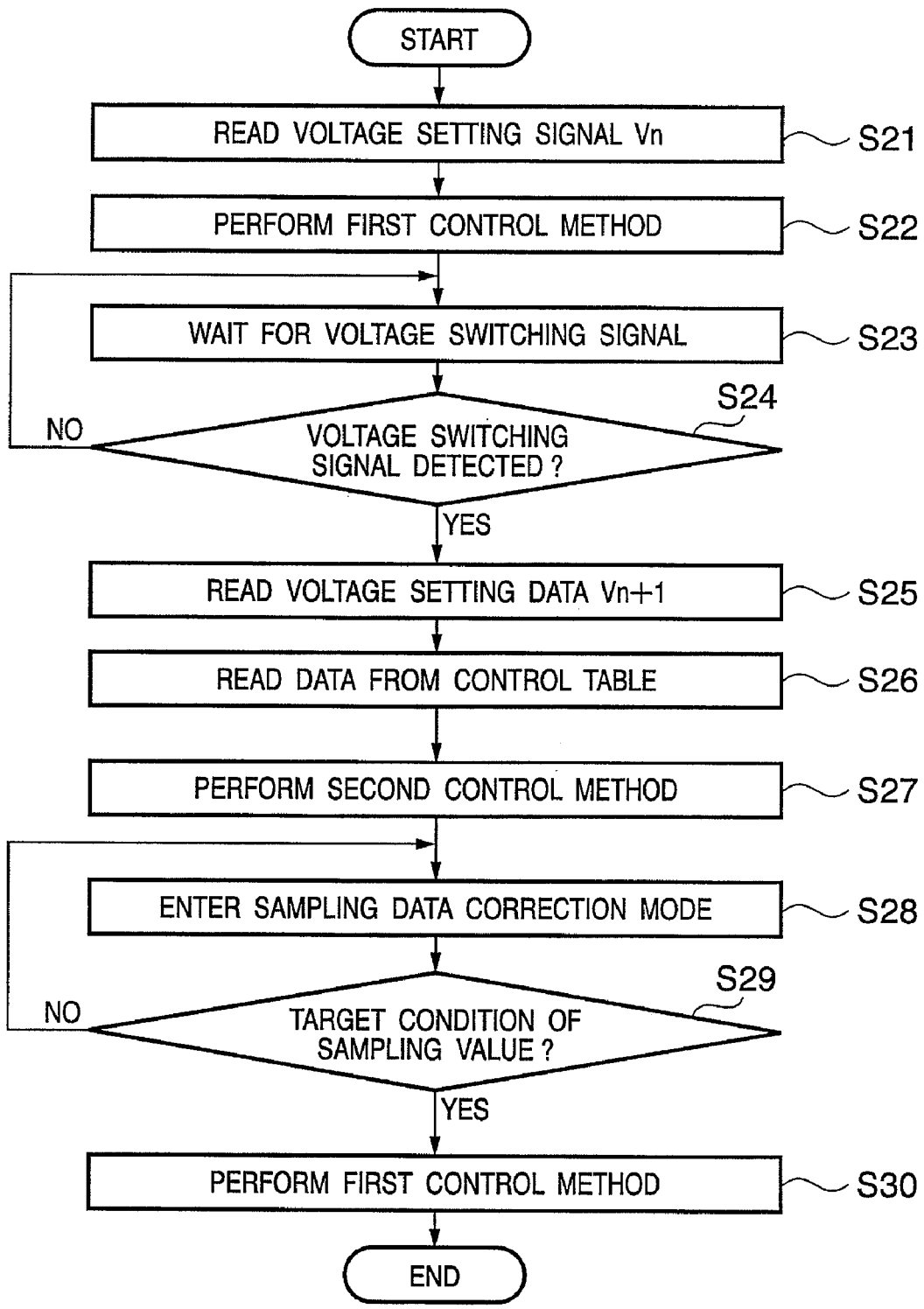
FIG. 13 is a flowchart showing the operation of a digital control unit 3 when changing the output voltage in the power supply for switching operation according to the second embodiment.

FIG. 13 is a flowchart showing the operation of the digital control unit 3 when changing the output voltage in the power supply for switching operation according to the second embodiment. An operation when a power supply 17 for switching operation changes the output voltage will be explained with reference to the flowchart of FIG. 13.

When the power supply 17 for switching operation is activated, the digital control unit 3 first reads voltage setting data Vn of an output voltage setting value from a controller 12 of the electronic apparatus (step S21). Then, the digital control unit 3 starts to perform PWM control according to the first control method at a constant switching frequency using sampling data of the A/D converter as a feedback amount (step S22). The digital control unit 3 continues control according to the first control method until the controller 12 of the electronic apparatus outputs a voltage switching signal (step S23).

After detecting the voltage switching signal (step S24), the digital control unit 3 reads set voltage data Vn+1 to be output (step S25). By referring to the values of A/D-converted sampling data of the output voltage detection circuit 7 and the set voltage data Vn+1, the digital control unit 3 reads out, from a control table 16, a control correction value corresponding to a change width obtained from these two data (step S26). In step S26, the digital control unit 3 may use set voltage data Vn (preceding set voltage data Vn) stored in the register of the digital control unit 3, as reference data in reading out the control table 16, in addition to the value of the set voltage data Vn+1.

Then, the control method is switched over to the second control method (step S27). The second control method in the second embodiment is feedback control based on the first control method. Since both the first and second control methods are feedback control to signal-process the detection value of the circuit by PWM, the second embodiment need not adjust the switching timing or the like upon switching control. Hence, the second embodiment can omit processes such as steps S7, S8, and S11 executed when switching over the control method in the first embodiment.

More specifically, the second control method in the first embodiment is feedforward control to read out the switching ON and OFF periods of the switching circuit 4 from the control table 16 and output them to the switching circuit 4 when switching the output voltage. On the contrary, the second control method in the second embodiment is feedback control to correct sampling data of the A/D converters 10 and 23 by control correction values read out from the control table 16. In this manner, the second embodiment newly arranges the current detection circuit 22 and A/D converter 23 to increase data on outputs supplied to the digital control unit 3. With this arrangement, the digital control unit 3 can grasp the operation state of the power supply 17 for switching operation (switching circuit 4) in more detail and perform more proper control.

In the second embodiment, the digital control unit 3 increases the switching speed of the output voltage of the power supply 17 for switching operation in the second control method as follows.

When changing a targeted output voltage, the digital control unit 3 reads out a control table for the second control method by referring to set voltage data Vn+1 and sampling data of the A/D converters 10 and 23. The digital control unit 3 may read out the control table for the second control method by referring to set voltage data Vn.

Next, the digital control unit 3 corrects arithmetic expressions for performing a PWM signal processing on sampling data of the A/D converters 10 and 23. Alternatively, the digital control unit 3 prepares a data table corresponding to corrected arithmetic expressions in advance. With this operation, the digital control unit 3 can achieve feedback control suited to high-speed switching of the output voltage.

Specific changes of the circuit operation are the following two points.

(1) How to adjust the switching ON and OFF periods of the switching circuit 4 changes.

(2) The switching cycle $T_{sw}$ changes.

Thereafter, the process enters a sampling data correction mode to terminate the execution of the second control method and wait for the timing when switching over to the first control method (step S28). In this mode, the digital control unit 3 tracks a change of sampling data until sampling data of the A/D converter satisfies a predetermined target condition set in the digital control unit 3 (step S29). If sampling data satisfies the target condition, the digital control unit 3 resets control correction, and the control method returns to the first control method (step S30).

As described above, the digital control unit 3 repeats a series of processes in the flowchart shown in FIG. 13 to change the output voltage $V_{out}$ of the power supply for switching operation, as needed.

As described above, the second embodiment can obtain the same effects as those of the first embodiment, and can further attain effects from its structural feature. More specifically, since the second embodiment arranges the current detection circuit to increase data on outputs from the power supply 17 for switching operation, the digital control unit 3 can execute more appropriate control. Since high-speed switching of the output voltage is implemented by control based on the feedback amount, the output voltage can be changed at high speed in correspondence with unpredictable external disturbance and variations in the characteristics of circuit building components.

(Modification)

A modification to the second embodiment will be explained. The modification is related to an application of the second control method in the first embodiment. The modification can perform control to correct data on the ON and OFF periods of the switching circuit and cope with unpredictable external disturbance and variations in the characteristics of circuit building components during execution of the second control method. Note that the modification assumes that the sampling times of the A/D converters 10 and 23 in the second embodiment are much shorter than the switching cycle of the switching circuit 4.

When detecting the output value of a power supply for switching operation having a digital control unit, the output value must be A/D-converted, and the sampling cycle of the A/D converter restricts the control frequency (cycle). Thus, digital control is inferior to analog control in terms of an increase in control speed. To solve this problem, the modification performs feedback control to forcibly determine the switching period on the basis of the control table upon switching the voltage, operate the power supply for switching operation, and correct data in the control table on the basis of the output value of the power supply for switching operation during the switching operation based on the control table.

Figure 14:
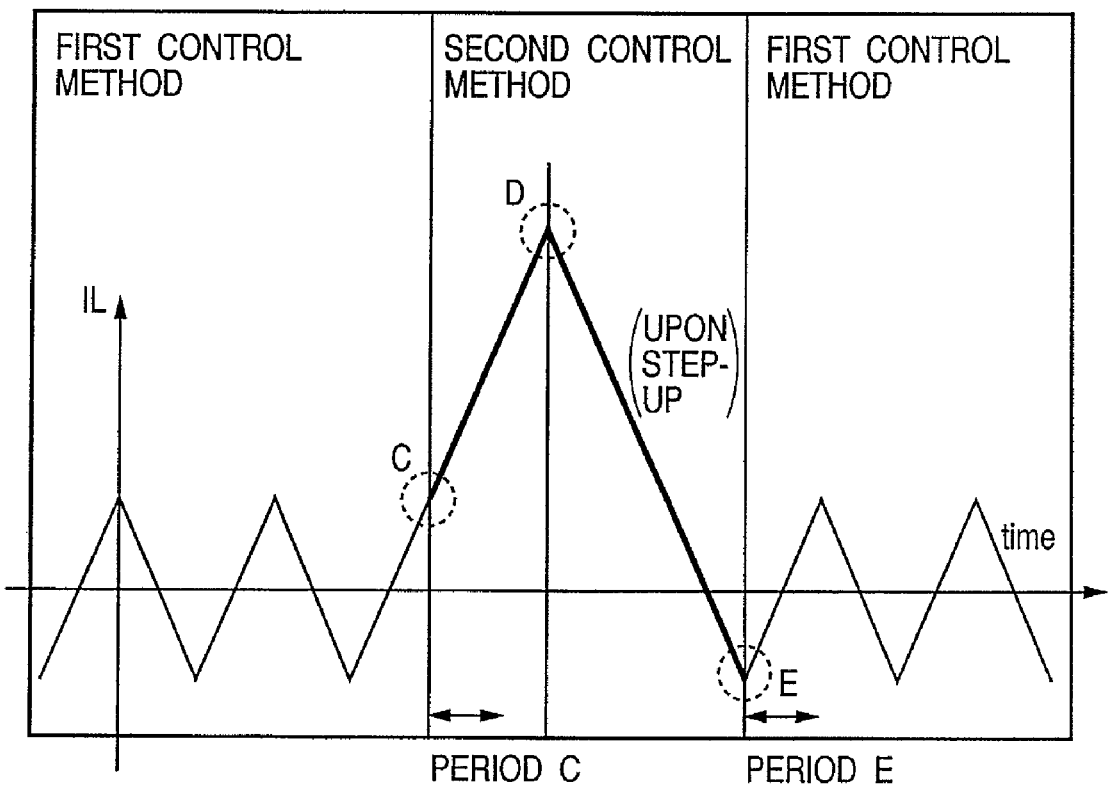
FIG. 14 is a timing chart for explaining control in a modification to the second embodiment.

FIG. 14 is a timing chart for explaining control in the modification. FIG. 14 shows an example of a switching process when increasing the voltage. The second control method is an application of control to read a control table used to switch over the output voltage $V_{out}$ to a target voltage value by a sufficient and minimum number of switching operations, as described in the first embodiment. Differences between control in the modification and that in the first embodiment will be described below.

(1) In the modification, the control method switches over to the second control method at point C shown in FIG. 14. From this point, sampling of the output voltage value and output circuit current value starts. A/D conversion of the output voltage value and output circuit current value is completed during the period C. Errors between the A/D conversion values of the output voltage value and output circuit current value, and values assumed at the switching point of the second control method are detected to correct the control table. To step up the voltage, the position of point D serving as the OFF timing in the second control method is changed by this correction. For example, if the output voltage after A/D conversion in period C is higher than an assumed voltage, the OFF timing D is controlled to be advanced on the basis of the error (peak D moves to the left). If the output voltage after A/D conversion in period C is lower than an assumed voltage, the OFF timing D is controlled to be delayed on the basis of the error (peak D moves to the right). The memory holds the resultant timing D.

(2) In FIG. 14, sampling of the output voltage value and output circuit current value starts from point E in FIG. 14 at which switching from the second control method to the first control method starts. A/D conversion of the output voltage value and output circuit current value is completed during the period E. Errors between the A/D conversion values of the output voltage value and output circuit current value, and target values assumed at the switching point of the first control method are detected to correct the control table. At this time, the control table in the second control method is corrected in addition to timing D described in (1) in order to reduce an error upon switching over from the second control method to the first control method.

The feature of (1) can correct the output voltage value and output circuit current value at the start of the second control method even if they vary due to external disturbance. As described with reference to FIGS. 8 and 9, variations in the initial value ILo of the output circuit current value upon switching the control method greatly influence the precision of the output voltage in control using the control table. Hence, the modification can attain a significant effect by detecting the value ILo and reflecting it in the control. In this case, the control table is preferably corrected without reflecting it in a subsequent control table (in next step-down switching).

The feature of (2) is effective particularly in correcting variations in the characteristics of the components of the power supply for switching operation. If the inductance value of the coil L 18 and the capacitance of the capacitor C 19 in the output circuit 5 vary, all data on the ON and OFF periods of the switching circuit 4 stored in the control table in advance are no longer proper duties. A decrease in voltage switching precision by variations in component characteristics can be suppressed by detecting the output voltage value and output circuit current value immediately after the end of switching the output voltage according to the second control method, and by correcting the control table on the basis of an error from the target value. In this case, a subsequent control table preferably reflects the correction of the control table.

<Specific Example of Electronic Apparatus>

Figure 15:
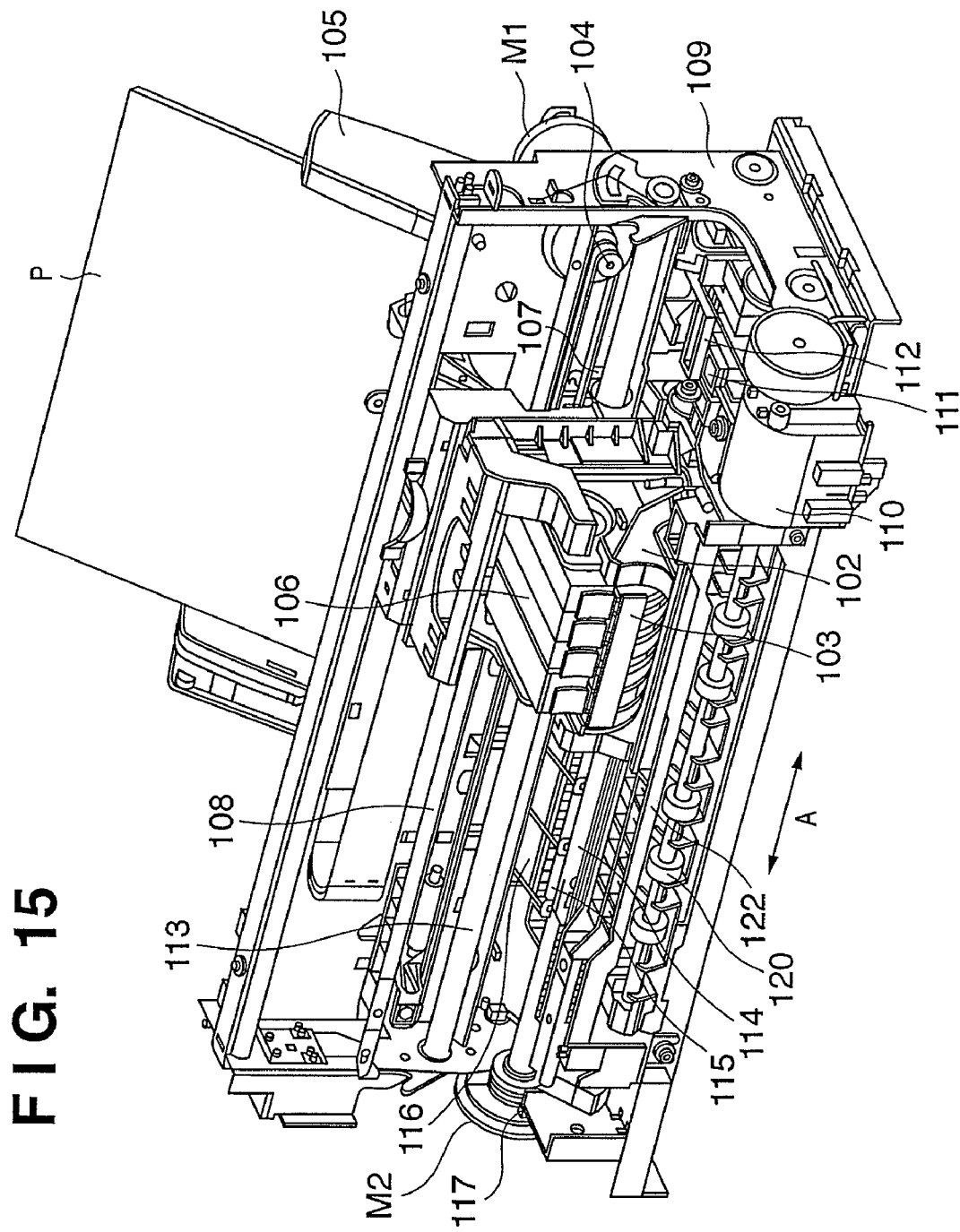
FIG. 15 is a perspective view showing the schematic structure of an inkjet printing apparatus as a typical example of an electronic apparatus having the power supply for switching operation according to the present invention.

FIG. 15 is a perspective view showing the schematic structure of an inkjet printing apparatus as a typical example of an electronic apparatus having the power supply for switching operation according to the present invention.

In the inkjet printing apparatus (to be referred to as a printing apparatus hereinafter), as shown in FIG. 15, a transmission mechanism 104 transmits a driving force generated by a carriage motor M1 to a carriage 102 which supports a printhead 103 for printing by discharging ink according to the inkjet method. The driving force reciprocates the carriage 102 in a direction indicated by an arrow A, and supplies a print medium P such as a print sheet via a paper feed mechanism 105 and conveys it to a print position. At the print position, the printhead 103 discharges ink to the print medium P to print.

In order to maintain a good state of the printhead 103, the carriage 102 moves to the position of a recovery device 110, which intermittently executes a discharge recovery operation for the printhead 103.

The carriage 102 of the printing apparatus supports not only the printhead 103, but also an ink cartridge 106 which stores ink to be supplied to the printhead 103. The ink cartridge 106 is detachable from the carriage 102.

The printing apparatus shown in FIG. 15 can print in color. For this purpose, the carriage 102 supports four ink cartridges which respectively store magenta (M), cyan (C), yellow (Y), and black (K) inks. The four ink cartridges are independently detachable.

The carriage 102 and printhead 103 can achieve and maintain a predetermined electrical connection by properly bringing their contact surfaces into contact with each other. The printhead 103 selectively discharges ink from a plurality of orifices and prints by applying energy in accordance with the print signal. In particular, the printhead 103 according to the embodiment adopts an inkjet method of discharging ink by using thermal energy. For this purpose, the printhead 103 comprises an electrothermal transducer for generating thermal energy. Electric energy applied to the electrothermal transducer is converted into thermal energy, and ink is discharged from orifices by using a change in pressure upon growth and shrinkage of bubbles by film boiling generated by applying the thermal energy to ink. The electrothermal transducer is arranged in correspondence with each orifice, and ink discharges from a corresponding orifice by applying a pulse voltage to a corresponding electrothermal transducer in accordance with the print signal.

As shown in FIG. 15, the carriage 102 is coupled to part of a driving belt 107 of the transmission mechanism 104 which transmits the driving force of the carriage motor M1. The carriage 102 is slidably guided and supported along a guide shaft 113 in the direction indicated by the arrow A. The carriage 102 reciprocates along the guide shaft 113 by normal rotation and reverse rotation of the carriage motor M1. A scale 108 representing the absolute position of the carriage 102 is arranged along the moving direction (direction indicated by the arrow A) of the carriage 102. In the embodiment, the scale 108 is prepared by printing black bars on a transparent PET film at a necessary pitch. One end of the scale 108 is fixed to a chassis 109, and its other end is supported by a leaf spring (not shown).

The printing apparatus has a platen (not shown) facing the orifice surface of the printhead 103 having orifices (not shown). The carriage 102 supporting the printhead 103 reciprocates by the driving force of the carriage motor M1. At the same time, the printhead 103 receives a print signal to discharge ink and print on the entire width of the print medium P conveyed onto the platen.

In FIG. 15, reference numeral 114 denotes a conveyance roller driven by a conveyance motor M2 in order to convey the print medium P; 115, a pinch roller which makes the print medium P abut the conveyance roller 114 by a spring (not shown); 116, a pinch roller holder which rotatably supports the pinch roller 115; and 117, a conveyance roller gear fixed to one end of the conveyance roller 114. The conveyance roller 114 is driven by rotation of the conveyance motor M2 that is transmitted to the conveyance roller gear 117 via an intermediate gear (not shown).

Reference numeral 120 denotes a discharge roller which discharges the print medium P bearing an image formed by the printhead 103 outside the printing apparatus. The discharge roller 120 is driven by transmitting rotation of the conveyance motor M2. The discharge roller 120 abuts a spur roller (not shown) which presses the print medium P by a spring (not shown). Reference numeral 122 denotes a spur holder which rotatably supports the spur roller.

In the printing apparatus, as shown in FIG. 15, the recovery device 110 which recovers the printhead 103 from a discharge failure is arranged at a desired position outside the reciprocation range (outside the printing area) for the printing operation of the carriage 102 supporting the printhead 103. In this example, the recovery device 110 is arranged at a position corresponding to a home position.

The recovery device 110 comprises a capping mechanism 111 which caps the orifice surface of the printhead 103, and a wiping mechanism 112 which cleans the orifice surface of the printhead 103. The recovery device 110 uses a suction means (suction pump or the like) within the recovery device to forcibly discharge ink from orifices in synchronism with capping of the orifice surface by the capping mechanism 111. By this forcible discharge, the recovery device 110 achieves a discharge recovery process of removing ink with a high viscosity or bubbles from the ink channel of the printhead 103.

In a non-printing operation or the like, the capping mechanism 111 caps the orifice surface of the printhead 103 to protect the printhead 103 and prevent evaporation and drying of ink. The wiping mechanism 112 is arranged near the capping mechanism 111, and wipes ink droplets attached to the orifice surface of the printhead 103.

The capping mechanism 111 and wiping mechanism 112 can maintain a normal ink discharge state of the printhead 103.

Figure 16:
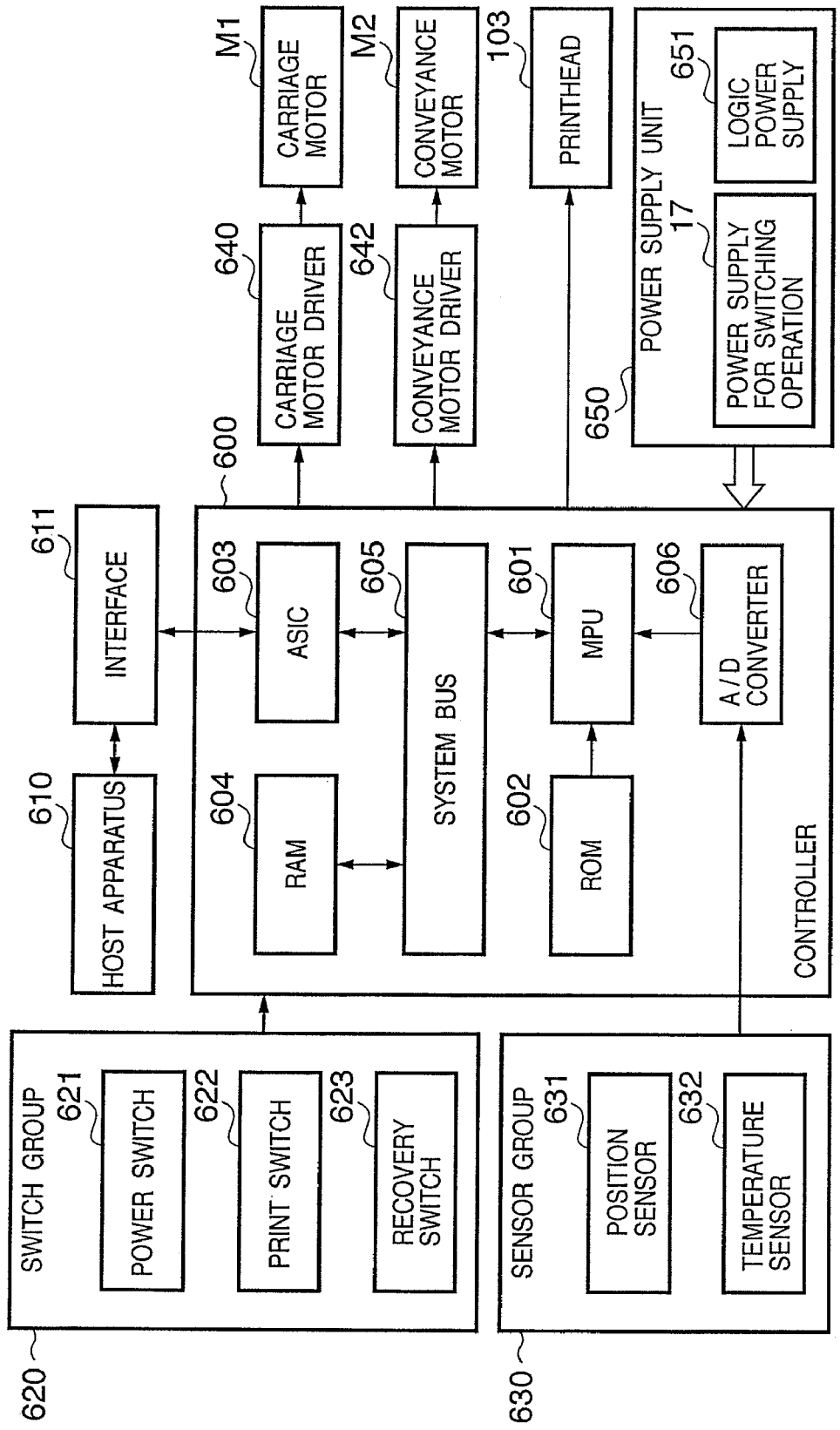
FIG. 16 is a block diagram showing the arrangement of the control circuit the printing apparatus in FIG. 15.

FIG. 16 is a block diagram showing the control arrangement of the printing apparatus shown in FIG. 15.

As shown in FIG. 16, a controller 600 comprises a CPU 601, and a ROM 602 which stores a program corresponding to a control sequence, a predetermined table, and other permanent data. The controller 600 further comprises an ASIC (Application Specific Integrated Circuit) 603 which generates control signals for controlling the carriage motor M1, conveyance motor M2, and printhead 103, and a RAM 604 having an image data expansion area, a work area for executing a program, and the like. In addition, the controller 600 comprises a system bus 605 which connects the CPU 601, ASIC 603, and RAM 604 to each other and allows them to exchange data, and an A/D converter 606 which receives analog signals from a sensor group (to be described below), A/D-converts the analog signals, and supplies digital signals to the CPU 601.

In FIG. 16, reference numeral 610 denotes a computer (or an image reader, digital camera, or the like) which serves as an image data supply source and is generally called a host apparatus. The host apparatus 610 and printing apparatus transmit/receive image data, commands, status signals, and the like via an interface (I/F) 611.

Reference numeral 620 denotes a switch group having a power supply switch 621, and a print switch 622 for designating the start of printing. The switch group 620 also comprises switches for receiving instruction inputs from an operator, such as a recovery switch 623 for designating start-up of a process (recovery process) to maintain good ink discharge performance of the printhead 103. Reference numeral 630 denotes a sensor group which detects an apparatus state and includes a position sensor 631 such as a photocoupler for detecting a home position h, and a temperature sensor 632 arranged at a proper portion of the printing apparatus in order to detect the ambient temperature.

Reference numeral 640 denotes a carriage motor driver which drives the carriage motor M1 for reciprocating the carriage 102 in the direction indicated by the arrow A; and 642, a conveyance motor driver which drives the conveyance motor M2 for conveying the print medium P.

The ASIC 603 transfers driving data (DATA) of a printing element (discharge heater) to the printhead while directly accessing the memory area of the RAM 602 in printing and scanning by the printhead 103.

The inkjet printing apparatus comprises a logic power supply 651 and the power supply 17 for switching operation as a power supply unit 650. The logic power supply 651 supplies power to the controller 600 including the CPU 601, the switch group 620, the sensor group 630, and the like. The power supply 17 for switching operation supplies power to the printhead 103. Note that the motors M1 and M2 separately receive powers via the motor drivers 640 and 642 (not shown).

The CPU 601, ROM, and RAM (or the controller 600 including them) in the control arrangement of FIG. 16 correspond to the control device 12 of the electronic apparatus main body in FIGS. 1 to 3.

Needless to say, various electronic apparatuses other than the above-described inkjet printing apparatus are conceivable as an electronic apparatus having the power supply for switching operation according to the present invention.

Other Embodiment

The embodiments of the present invention have been described in detail. The present invention may be applied to a system (electronic apparatus) including a plurality of devices or a power supply for switching operation formed from a single device.

The present invention is also achieved when a software program for implementing the functions of the above-described embodiments is supplied to a system or apparatus directly or from a remote place, and the computer of the system or apparatus reads out and executes the supplied program. The above embodiments are implementable by a program corresponding to at least one of the flowcharts in FIGS. 12 and 13. Even in this case, the implementation need not be the program as far as the program functions can be obtained.

The present invention is also implemented by program codes installed in a computer in order to implement the functional processes of the invention by the computer. That is, the claims of the invention also cover a computer program for implementing the functional processes of the invention.

In this case, the program takes any form such as an object code, a program executed by an interpreter, or script data supplied to an OS as far as the program functions can be obtained.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-304582, filed Oct. 19, 2005, which is hereby incorporated by reference herein in its entirety.

What is claimed is:

1. A power supply for switching operation, comprising:
   a switching circuit which switches input power by a switching element and generates a pulse output;
   an output circuit which converts an output from said switching circuit into a DC current and outputs the DC current;
   a control table which stores data on an ON period and OFF period of said switching circuit in correspondence with a set voltage;
   an arithmetic processing unit which performs reading operation from said control table and PWM operation; and
   a digital control unit which controls said switching circuit by outputting a PWM signal,
   wherein said digital control unit performs first control to control said switching circuit by feedback control based on a difference signal between the detected output voltage and a targeted output voltage in a case where the targeted output voltage is not changed, and performs second control to control said switching circuit on the basis of data read out from said control table in a case where the targeted output voltage is changed.

2. The power supply according to claim 1, further comprising an output voltage detection circuit which detects a voltage output from said output circuit,
   wherein in a case where the targeted output voltage is changed in the second control of said digital control unit, said digital control unit corrects data read out from said control table on the basis of the detected output voltage value, and controls said switching circuit on the basis of the corrected data.

3. The power supply according to claim 1, wherein
   said output circuit includes a smoothing filter having a coil and a capacitor, and
   said digital control unit controls to shorten a period during which the second control is performed, so as not to saturate the coil.

4. The power supply according to claim 3, wherein said digital control unit switches over between the first control and the second control at a timing within either a first range where the coil current exhibits a maximum value or a second range where the coil current exhibits a minimum value in a cycle of the switching element in the first control.

5. The power supply according to claim 3, wherein said digital control unit sets a stabilization period for stabilizing the difference signal upon switching over from the second control to the first control.

6. The power supply according to claim 1, wherein
   said control table stores correction data for the ON period and OFF period of said switching circuit in correspondence with the set voltage, and
   the second control controls said switching circuit by feedback control based on the correction data read out from said control table.

7. An electronic apparatus which includes a power supply for switching operation according to claim 1, wherein a control device which controls the overall electronic apparatus incorporates said digital control unit.

8. The apparatus according to claim 7, wherein the apparatus is configured to print by a printhead having a plurality of printing elements, and receives a driving voltage of the printhead from the power supply for switching operation.

9. A method of controlling a power supply for switching operation comprising: a switching circuit which switches input power by a switching element and generates a pulse output; an output circuit which converts an output from the switching circuit into a DC current and outputs the DC current; a control table which stores data on an ON period and OFF period of the switching circuit in correspondence with a set voltage; an arithmetic processing unit which performs reading operation from the control table and PWM operation; and a digital control unit which controls the switching circuit by outputting a PWM signal, said method comprising the step of switching over between
   a first operation of controlling the switching circuit by feedback control based on a difference signal between the detected output voltage and a targeted output voltage in a case where the targeted output voltage is not changed, and
   a second operation of controlling the switching circuit on the basis of data read out from the control table in a case where the targeted output voltage is changed.

* * * * *